US012699484B2

(12) United States Patent
So et al.

(10) Patent No.: US 12,699,484 B2
(45) Date of Patent: Aug. 4, 2026

(54) ELECTRONIC DEVICE, INTERFACE DEVICE AND DRIVING METHOD WITH INTERPOLATED SENSING DATA FOR COMPENSATION OF NOISE

(71) Applicant: SAMSUNG DISPLAY CO., LTD., Yongin-si (KR)

(72) Inventors: Yongsub So, Yongin-si (KR); Sanghun Park, Yongin-si (KR); Youngmin Park, Yongin-si (KR); Bo-Hwan Lee, Yongin-si (KR); Byeongkyu Jeon, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/945,199

(22) Filed: Nov. 12, 2024

(65) Prior Publication Data

US 2025/0199644 A1 Jun. 19, 2025

(30) Foreign Application Priority Data

Dec. 15, 2023 (KR) ........................ 10-2023-0183727
Apr. 12, 2024 (KR) ........................ 10-2024-0049298

(51) Int. Cl.
*G06F 3/041* (2006.01)
*G09G 3/00* (2006.01)
*G09G 3/32* (2016.01)

(52) U.S. Cl.
CPC ........ *G06F 3/04184* (2019.05); *G06F 3/0412* (2013.01); *G09G 3/035* (2020.08);
(Continued)

(58) Field of Classification Search
CPC .............. G06F 3/0412; G06F 3/04166; G06F 3/04184; G09G 3/035; G09G 3/32;
(Continued)

(56) References Cited

U.S. PATENT DOCUMENTS 9,766,730 B2 9/2017 Lee
11,036,331 B2 6/2021 Kim et al.
(Continued)

FOREIGN PATENT DOCUMENTS

KR 10-2023-0089627 6/2023
KR 10-2555832 7/2023

*Primary Examiner* — Liliana Cerullo
(74) *Attorney, Agent, or Firm* — F. CHAU & ASSOCIATES, LLC

(57) ABSTRACT

An electronic device includes a display layer, a sensor layer that outputs k-th sensing data for a first input during a k-th sensing period in a first mode, and a sensor driver that receives the k-th sensing data from the sensor layer, where k is an integer greater than or equal to 2. The sensor driver determines a period, in which the k-th sensing data is sensed, from among a noise period and a noise-free period, and compares noise included in the k-th sensing data with predetermined reference noise when the k-th sensing data is data sensed in the noise period. When the noise included in the k-th sensing data is greater than the reference noise, the sensor driver generates k-th compensation sensing data by interpolating the k-th sensing data, and generates coordinate information about the first input of the k-th sensing period based on the k-th compensation sensing data.

25 Claims, 14 Drawing Sheets

(52) U.S. Cl.
CPC ..... *G09G 3/32* (2013.01); *G06F 2203/04102*
(2013.01); *G09G 2300/0426* (2013.01); *G09G
2310/0202* (2013.01); *G09G 2354/00*
(2013.01)

(58) Field of Classification Search
CPC ... G09G 2300/0426; G09G 2310/0202; G09G
2354/00
See application file for complete search history.

(56)                     References Cited

U.S. PATENT DOCUMENTS

| | | | |
|---|---|---|---|
| 12,242,695 B1 * | 3/2025 | Deselaers | ........... G06F 3/04166 |
| 2023/0125764 A1 * | 4/2023 | Kim | ...................... G06F 1/1643 |
| | | | 345/173 |
| 2023/0185401 A1 | 6/2023 | Lee | |
| 2023/0409144 A1 * | 12/2023 | Slassi | ................... G06F 3/0441 |
| 2024/0019958 A1 * | 1/2024 | Su | ...................... G06F 3/04162 |

* cited by examiner

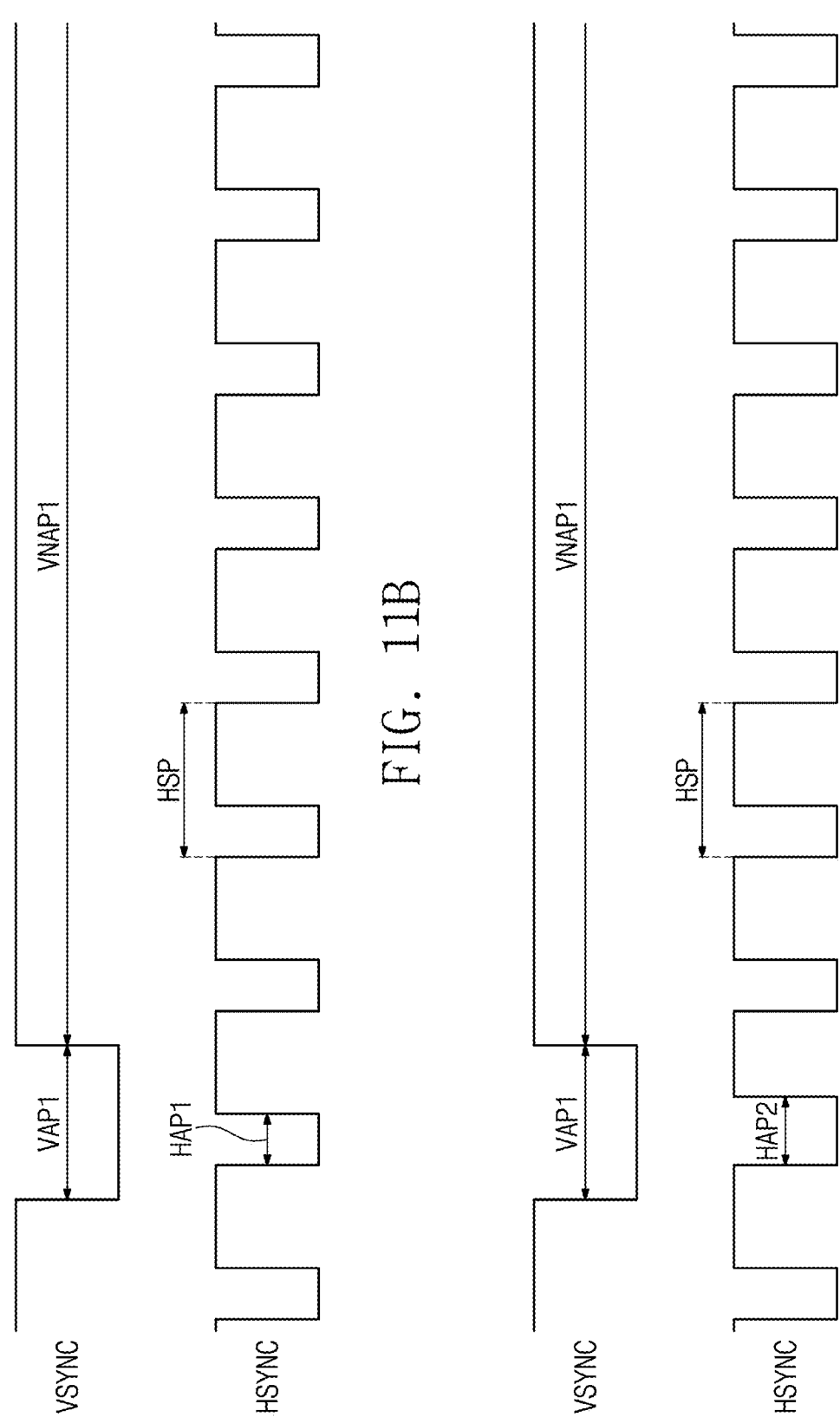

ELECTRONIC DEVICE, INTERFACE DEVICE AND DRIVING METHOD WITH INTERPOLATED SENSING DATA FOR COMPENSATION OF NOISE

CROSS-REFERENCE TO RELATED APPLICATIONS

This application claims priority under 35 U.S.C. § 119 to Korean Patent Application No. 10-2023-0183727 filed on Dec. 15, 2023, and Korean Patent Application No. 10-2024-0049298 filed on Apr. 12, 2024, the disclosures of which are incorporated by reference herein in their entireties.

TECHNICAL FIELD

Embodiments of the present disclosure described herein relate to an electronic device capable of detecting an external input, an interface device including the same, and a method of driving the same.

DISCUSSION OF RELATED ART

An electronic device may detect an external input applied from outside of the electronic device. The external input may be a user input. The user input may include various types of external inputs such as a part of the user's body, light, heat, a pen, or pressure. The electronic device may recognize coordinates of a pen in an electromagnetic resonance (EMR) scheme or an active electrostatic (AES) scheme.

SUMMARY

Embodiments of the present disclosure provide an electronic device with increased detection reliability in detecting an external input, and an interface device including the same.

Embodiments of the present disclosure provide a driving method for an electronic device capable of increasing detection reliability in detecting an external input.

According to an embodiment, an electronic device includes a display layer that displays an image in units of a frame, a sensor layer disposed on the display layer and operating in a first mode, in which a first input is sensed, and outputting k-th sensing data for the first input during a k-th sensing period in the first mode, and a sensor driver that drives the sensor layer and receives the k-th sensing data from the sensor layer.

The sensor driver determines a period, in which the k-th sensing data is sensed, from among a noise period and a noise-free period, compares noise included in the k-th sensing data with predetermined reference noise when the k-th sensing data is data sensed in the noise period, generates k-th compensation sensing data by interpolating the k-th sensing data when the noise included in the k-th sensing data is greater than the reference noise, and generates coordinate information about the first input of the k-th sensing period based on the k-th compensation sensing data. Here, k is an integer greater than or equal to 2.

According to an embodiment, an interface device includes an electronic device, and an input device that communicates with the electronic device. The electronic device includes a display layer that displays an image in units of a frame, a sensor layer disposed on the display layer and detecting an input by the input device and outputting k-th sensing data for the input during a k-th sensing period, and a sensor driver that drives the sensor layer and receives the k-th sensing data from the sensor layer.

The sensor driver determines a period, in which the k-th sensing data is sensed, from among a noise period and a noise-free period, compares noise included in the k-th sensing data with predetermined reference noise when the k-th sensing data is data sensed in the noise period, generates k-th compensation sensing data by interpolating the k-th sensing data when the noise included in the k-th sensing data is greater than the reference noise, and generates coordinate information about the input of the k-th sensing period based on the k-th compensation sensing data. Here, k is an integer greater than or equal to 2.

According to an embodiment, a driving method of an electronic device includes displaying an image in units of a frame, outputting k-th sensing data for an input during a k-th sensing period in which the input is sensed, determining a period, in which the k-th sensing data is sensed, from among a noise period and a noise-free period, comparing noise included in the k-th sensing data with predetermined reference noise when the k-th sensing data is data sensed in the noise period, generating k-th compensation sensing data by interpolating the k-th sensing data when the noise included in the k-th sensing data is greater than the reference noise, and generating coordinate information about the input of the k-th sensing period based on the k-th compensation sensing data. Here, k is an integer greater than or equal to 2.

BRIEF DESCRIPTION OF THE DRAWINGS

The above and other objects and features of the present disclosure will become more apparent by describing in detail embodiments thereof with reference to the accompanying drawings.

FIGS. 11A to 11D are waveform diagrams showing a vertical synchronization signal and a horizontal synchronization signal, according to an embodiment of the present disclosure.

DETAILED DESCRIPTION

Figure 1:
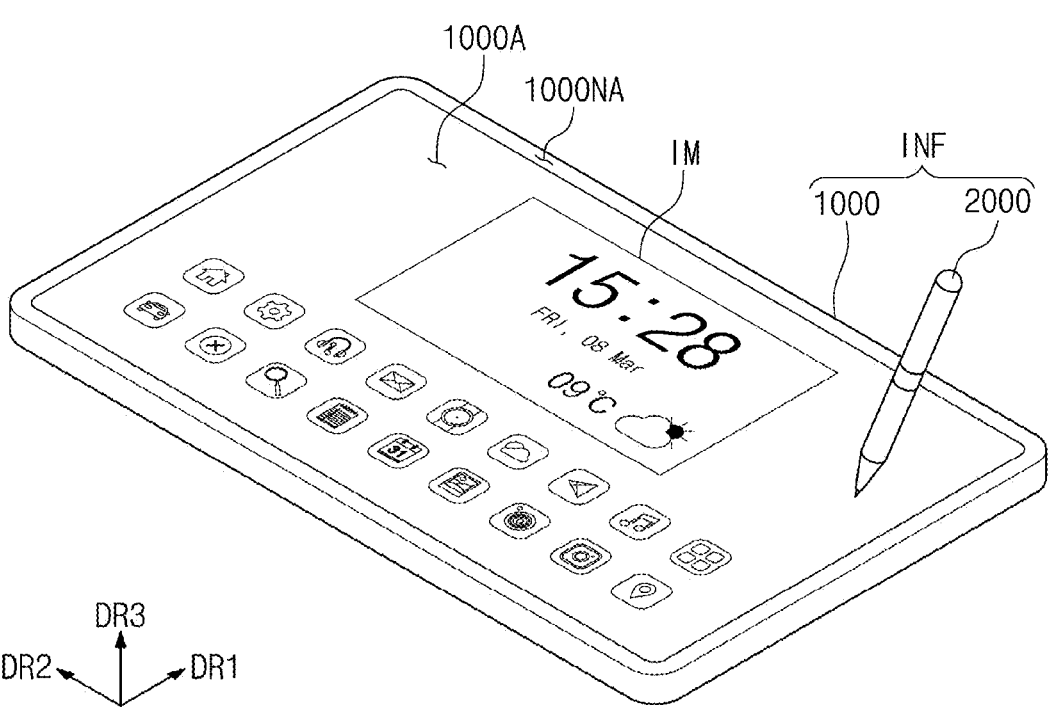
FIG. 1 is a perspective view illustrating an interface device, according to an embodiment of the present disclosure.

Embodiments of the present disclosure will be described more fully hereinafter with reference to the accompanying drawings. Like reference numerals may refer to like elements throughout the accompanying drawings It will be understood that when a component such as a film, a region, a layer, etc., is referred to as being "on", "connected to", "coupled to", or "adjacent to" another component, it can be directly on, connected, coupled, or adjacent to the other component, or intervening components may be present. It will also be understood that when a component is referred to as being "between" two components, it can be the only component between the two components, or one or more intervening components may also be present. It will also be understood that when a component is referred to as "covering" another component, it can be the only component covering the other component, or one or more intervening components may also be covering the other component. Other words used to describe the relationships between components should be interpreted in a like fashion.

The term "and/or" includes one or more combinations in each of which associated elements are defined.

Although the terms "first", "second", etc. may be used to describe various components, the components should not be construed as being limited by the terms. The terms are only used to distinguish one component from another component. For example, without departing from the scope and spirit of the present disclosure, a first component may be referred to as a second component, and similarly, the second component may be referred to as the first component.

The articles "a," "an," and "the" are singular in that they have a single referent, but the use of the singular form in the specification should not preclude the presence of more than one referent.

Spatially relative terms, such as "beneath", "below", "lower", "under", "above", "upper", etc., may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

The terms "about" or "approximately" as used herein are inclusive of the stated value and means within an acceptable range of deviation for the particular value as determined by one of ordinary skill in the art, considering the measurement in question and the error associated with measurement of the particular quantity (e.g., the limitations of the measurement system). For example, "about" or "approximately" can mean within one or more standard deviations, or within ±30%, 20%, 10% or 5% of the stated value.

FIG. 1 is a perspective view illustrating an interface device, according to an embodiment of the present disclosure.

Referring to FIG. 1, an interface device INF may include an electronic device 1000 and an input device 2000.

The electronic device 1000 may be a device activated depending on an electrical signal. For example, the electronic device 1000 may be a mobile phone, a tablet, a car navigation system, a game console, a notebook computer, or a wearable device, but is not limited thereto. FIG. 1 illustrates an embodiment in which the electronic device 1000 is a tablet PC.

A display area 1000A and a peripheral area 1000NA may be defined in the electronic device 1000. The electronic device 1000 may display an image IM through the display area 1000A. The display area 1000A may include a plane defined by a first direction DR1 and a second direction DR2. The peripheral area 1000NA may surround the peripheral area of the display area 1000A. In an embodiment of the present disclosure, the peripheral area 1000NA may be omitted.

A thickness direction of the electronic device 1000 may be parallel to a third direction DR3 intersecting the first direction DR1 and the second direction DR2. Accordingly, front surfaces (or upper surfaces) and back surfaces (or lower surfaces) of members constituting the electronic device 1000 may be defined based on the third direction DR3.

The electronic device 1000 may display the image IM in the third direction DR3. The image IM may include a still image as well as a moving image (e.g., a video). In FIG. 1, a clock and icons are illustrated as an example of the image IM.

The electronic device 1000 may detect inputs applied from the outside of the electronic device 1000. The external inputs may include various types of external inputs such as, for example, a portion of a user's body, light, heat, pressure, or the like.

The electronic device 1000 illustrated in FIG. 1 may detect an input by the user's touch and an input by the input device 2000. The input device 2000 may refer to a device other than the user's body. An input by the input device 2000 may be referred to as a "first input", and an input by the user's body may be referred to as a "second input". For example, the input device 2000 may be an active pen, a stylus pen, a touch pen, or an electronic pen.

The electronic device 1000 and the input device 2000 may be capable of bidirectional communication. For example, the electronic device 1000 may provide an uplink signal to the input device 2000, and the input device 2000 may provide a downlink signal to the electronic device 1000. The electronic device 1000 may detect a signal provided from the input device 2000 and may generate coordinate information for the first input by using the detected signal.

Figure 2:
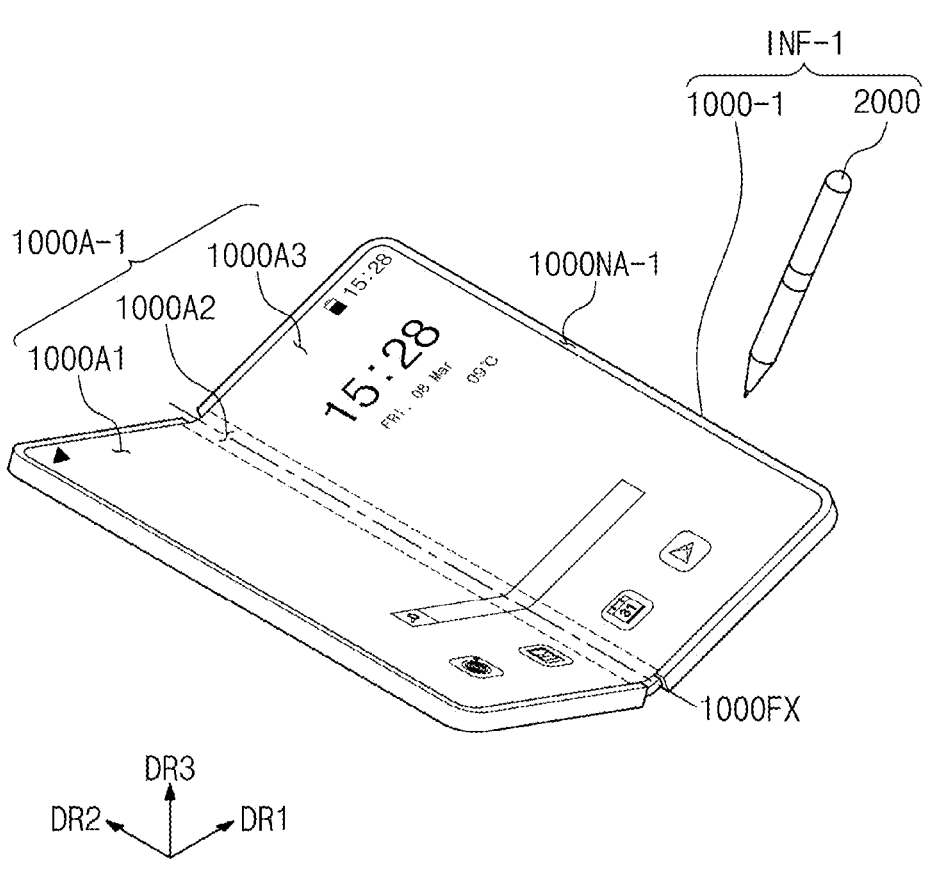
FIG. 2 is a perspective view illustrating an interface device, according to an embodiment of the present disclosure.

FIG. 2 is a perspective view illustrating an interface device, according to an embodiment of the present disclosure. In the description of FIG. 2, the same reference numerals are assigned to the same components described with reference to FIG. 1, and thus, for convenience of explanation, redundant descriptions thereof are omitted.

Referring to FIG. 2, an interface device INF-1 may include an electronic device 1000-1 and the input device 2000. FIG. 2 illustrates an embodiment in which the electronic device 1000-1 is a foldable mobile phone.

The electronic device 1000-1 may display an image through a display area 1000A-1. The display area 1000A-1 may include a plane defined by the first direction DR1 and the second direction DR2, in a state where the electronic device 1000-1 is unfolded.

The display area 1000A-1 may include a first area 1000A1, a second area 1000A2, and a third area 1000A3. The first area 1000A1, the second area 1000A2, and the third area 1000A3 may be sequentially defined in the first direction DR1. The second area 1000A2 may be bent about a folding axis 1000FX extending in the second direction DR2. Accordingly, the first area 1000A1 and the third area 1000A3 may be referred to as "non-folding areas", and the second area 1000A2 may be referred to as a "folding area".

When the electronic device 1000-1 is folded, the first area 1000A1 and the third area 1000A3 may face each other. Accordingly, while the electronic device 1000-1 is fully folded, the display area 1000A-1 may not be exposed to the outside. This operation may be referred to as "in-folding". However, this is only an example, and an operation of the electronic device 1000-1 is not limited thereto.

For example, according to an embodiment of the present disclosure, when the electronic device 1000-1 is folded, the first area 1000A1 and the third area 1000A3 may be opposed to each other. Accordingly, in a state where the electronic device 1000-1 is folded, the display area 1000A-1 may be exposed to the outside. This operation may be referred to as "out-folding".

The electronic device 1000-1 may be implemented to perform only one of an in-folding operation or an out-folding operation. Alternatively, the electronic device 1000-1 may be implemented to perform both an in-folding operation and an out-folding operation. In this case, the same area of the electronic device 1000-1, for example, the second area 1000A2, may be in-folded and out-folded.

One folding area and two non-folding areas are illustrated in FIG. 2, but the number of folding areas and the number of non-folding areas are not limited thereto. For example, according to embodiments, the electronic device 1000-1 may include a plurality of non-folding areas, of which the number is greater than two, and a plurality of folding areas interposed between non-folding areas adjacent to one another.

FIG. 2 illustrates that the folding axis 1000FX extends in the second direction DR2, but the present disclosure is not limited thereto. For example, according to embodiments, the folding axis 1000FX may extend in a direction parallel to the first direction DR1. In this case, the first area 1000A1, the second area 1000A2, and the third area 1000A3 may be sequentially arranged in the second direction DR2.

The display area 1000A-1 may overlap at least one or more electronic modules. For example, the electronic modules may include a camera module, a proximity illuminance sensor, and the like. The electronic modules may receive an external input delivered through the display area 1000A-1 or may provide an output through the display area 1000A-1. A part of the display area 1000A-1 that overlaps the camera module, the proximity illuminance sensor, and the like may have a higher transmittance than the other parts of the display area 1000A-1. Accordingly, an additional area for arranging a plurality of electronic modules in the peripheral area 1000NA-1 around the display area 100A-1 may be omitted. As a result, an area ratio of the display area 1000A-1 to the front surface of the electronic device 1000-1 may be increased.

The electronic device 1000-1 and the input device 2000 may be capable of bidirectional communication. The electronic device 1000-1 may provide an uplink signal to the input device 2000. The input device 2000 may provide a downlink signal to the electronic device 1000-1. The electronic device 1000-1 may detect a signal provided from the input device 2000 and may generate coordinate information about a first input by using the detected signal.

Figure 3:
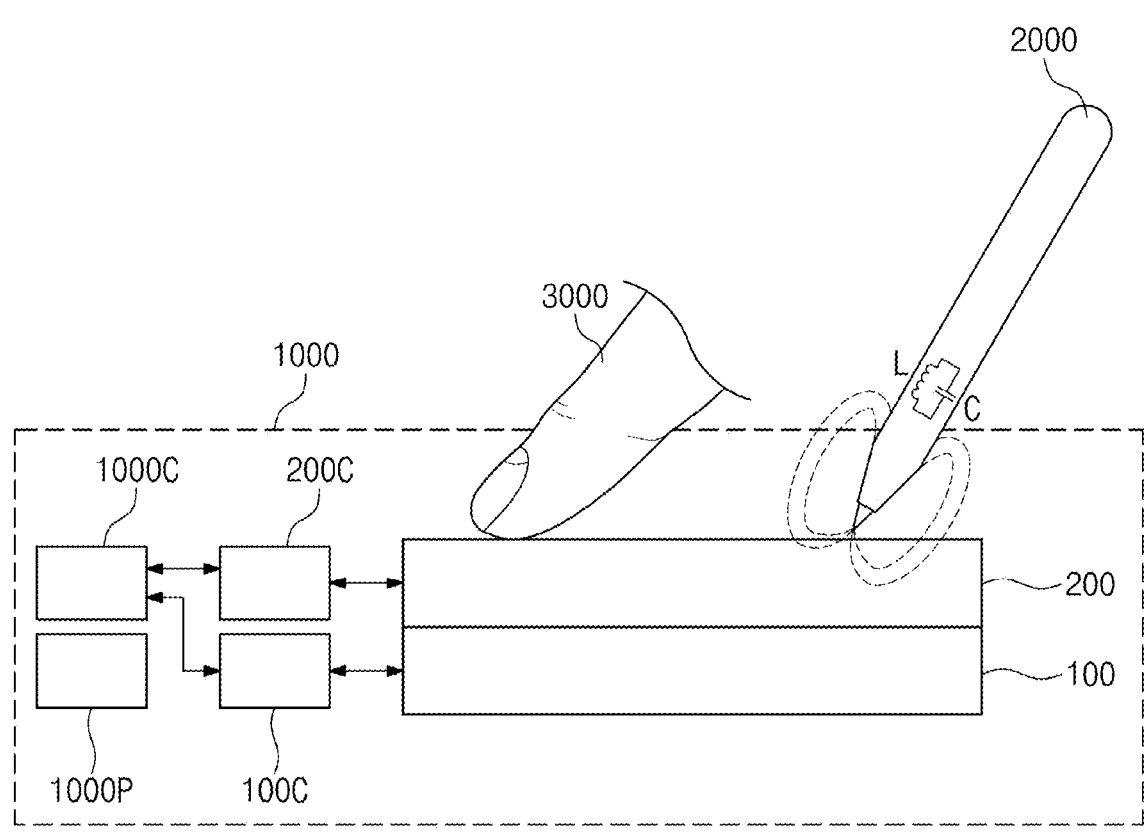
FIG. 3 is a block diagram schematically illustrating an electronic device and an input device, according to an embodiment of the present disclosure.

FIG. 3 is a block diagram schematically illustrating an electronic device and an input device, according to an embodiment of the present disclosure.

Referring to FIG. 3, the electronic device 1000 may include a display layer 100, a sensor layer 200, a display driver 100C (also referred to as a display driver circuit), a sensor driver 200C (also referred to as a sensor driver circuit), and a main controller 1000C (also referred to as a main controller circuit).

The display layer 100 may be a component that substantially generates an image. The display layer 100 may be a light emitting display layer. For example, the display layer 100 may be an organic light emitting display layer, an inorganic light emitting display layer, an organic-inorganic light emitting display layer, a quantum dot display layer, a micro-LED display layer, or a nano-LED display layer.

The sensor layer 200 may be disposed on the display layer 100. The sensor layer 200 may sense a first input or a second input, which are applied from outside of the electronic device 1000. Each of the first input and the second input may be an input means capable of providing a change in the capacitance of the sensor layer 200 or an input means capable of causing an induced current in the sensor layer 200. For example, the first input may be an input by the input device 2000 (e.g., a pen) or an input by an RFID tag. For example, the input device 2000 may include a passive-type pen or an active-type pen. The second input may be a passive-type of an input means such as a user's body 3000 (e.g., a finger).

In an embodiment of the present disclosure, the input device 2000 may be a device that generates a magnetic field of a predetermined resonant frequency. The input device 2000 may be configured to transmit an output signal based on an electromagnetic resonance method. The input device 2000 may be referred to as an "input pen", a "magnetic pen", a "stylus pen", or an "electromagnetic resonance pen".

The input device 2000 may include an RLC resonant circuit, and the RLC resonant circuit may include an inductor L and a capacitor C. In an embodiment of the present disclosure, the RLC resonant circuit may be a variable resonant circuit that varies a resonance frequency. In this case, the inductor L may be a variable inductor and/or the capacitor C may be a variable capacitor. However, embodiments of the present disclosure are not limited thereto.

The inductor L generates a current by a magnetic field formed in the electronic device 1000, for example, the sensor layer 200. However, embodiments of the present disclosure are not limited thereto. For example, when the input device 2000 operates as an active type, the input device 2000 may generate a current even when not receiving a magnetic field from outside of the electronic device 1000. The generated current is delivered to the capacitor C. The capacitor C charges the current input from the inductor L, and discharges the charged current to the inductor L. Afterwards, the inductor L may emit a magnetic field at the resonant frequency. The induced current may flow in the sensor layer 200 by the magnetic field emitted by the input device 2000, and the induced current may be delivered to the sensor driver 200C as a reception signal (or a sensing signal).

The main controller 1000C may control overall operations of the electronic device 1000. For example, the main controller 1000C may control operations of the display driver 100C and the sensor driver 200C. The main controller 1000C may include at least one microprocessor and may further include a graphics controller. The main controller 1000C may be referred to as an "application processor", "central processing unit", or "main processor".

The display driver 100C may drive the display layer 100. The display driver 100C may receive image data RGB (see FIG. 6) and a control signal CTRL (see FIG. 6) from the main controller 1000C. The control signal CTRL may include various signals. For example, the control signal CTRL may include a vertical synchronization signal, a horizontal synchronization signal, a main clock, and a data enable signal. The display driver 100C may generate a control signal (e.g., a scan control signal GCS or a data control signal DCS (see FIG. 6)) used to control the timing for providing signals to the display layer 100 based on the control signal CTRL.

The sensor driver 200C may drive the sensor layer 200. The sensor driver 200C may receive a control signal I-CS (see FIG. 8) from the main controller 1000C. The control signal I-CS may include the clock signal of the sensor driver 200C. Moreover, the control signal I-CS may further include a mode determination signal used to determine operating modes of the sensor driver 200C and the sensor layer 200.

The sensor driver 200C may be implemented as an integrated circuit (IC) and may be electrically connected to the sensor layer 200. For example, the sensor driver 200C may be mounted directly on a predetermined area of the display panel or mounted on a separate printed circuit board in a chip-on-film (COF) method to be electrically connected to the sensor layer 200.

The sensor driver 200C and the sensor layer 200 may selectively operate in a first mode or a second mode. For example, the first mode may be a mode in which an input by the input device 2000, for example, the first input, is sensed. The second mode may be a mode in which an input of a touch input, for example, the second input, is sensed. The first mode may be referred to as a "pen sensing mode" or "first sensing mode", and the second mode may be referred to as a "touch sensing mode" or "second sensing mode".

The switching between the first mode and the second mode may be accomplished in a variety of manners. For example, the sensor driver 200C and the sensor layer 200 may operate in the first mode and the second mode in a time-division method and may sense the first input and the second input. Alternatively, the switching between the first mode and the second mode may occur due to a user's selection or the user's specific action (or input), either the first mode or the second mode may be activated or deactivated by activating or deactivating a specific application, or one mode may be switched to the other mode. Alternatively, while alternately operating in the first mode and the second mode, the sensor driver 200C and the sensor layer 200 may be maintained in the first mode when the first input is sensed, or may be maintained in the second mode when the second input is sensed.

The sensor driver 200C may calculate coordinate information about an input based on a signal received from the sensor layer 200 and may provide the main controller 1000C with a coordinate signal I-SS (see FIG. 8) having the coordinate information. The main controller 1000C may execute an operation corresponding to a user input based on the coordinate signal I-SS. For example, the main controller 1000C may operate the display driver 100C such that a new application image is displayed on the display layer 100 based on the coordinate signal I-SS.

A power supply circuit 1000P may include a power management integrated circuit (PMIC). The power supply circuit 1000P may generate a plurality of driving voltages that drive the display layer 100, the sensor layer 200, the display driver 100C, and the sensor driver 200C. For example, a plurality of driving voltages may include a gate-on voltage, a gate-off voltage, a first driving voltage (e.g., ELVDD voltage), a second driving voltage (e.g., ELVSS voltage), an initialization voltage, and the like. However, embodiments of the present disclosure are not limited to the above examples.

Figure 4A:
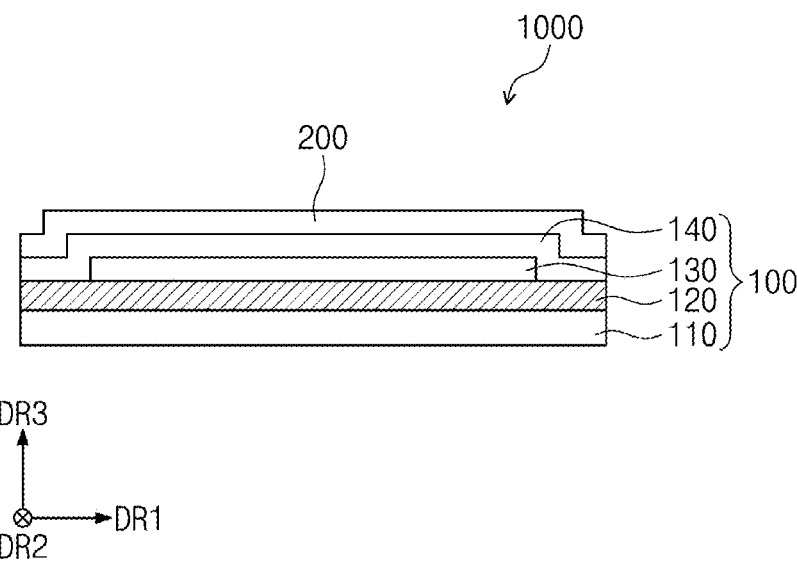
FIG. 4A is a cross-sectional view of an electronic device, according to an embodiment of the present disclosure.

FIG. 4A is a cross-sectional view of an electronic device, according to an embodiment of the present disclosure.

Referring to FIG. 4A, the electronic device 1000 may include the display layer 100 and the sensor layer 200. The display layer 100 may include a base layer 110, a circuit layer 120, a light emitting element layer 130, and an encapsulation layer 140.

The base layer 110 may be a member that provides a base surface on which the circuit layer 120 is disposed. The base layer 110 may be, for example, a glass substrate, a metal substrate, or a polymer substrate. However, embodiments of the present disclosure are not limited thereto. For example, the base layer 110 may be an inorganic layer, an organic layer, or a composite material layer.

The base layer 110 may have a multi-layer structure. For example, the base layer 110 may include a first synthetic resin layer, a silicon oxide ($SiO_x$) layer disposed on the first synthetic resin layer, an amorphous silicon (a-Si) layer disposed on the silicon oxide layer, and a second synthetic resin layer disposed on the amorphous silicon layer. The silicon oxide layer and the amorphous silicon layer may be referred to as a "base barrier layer".

The circuit layer 120 may be disposed on the base layer 110. The circuit layer 120 may include, for example, an insulating layer, a semiconductor pattern, a conductive pattern, and a signal line. The insulating layer, the semiconductor layer, and the conductive layer may be formed on the base layer 110 in a manner such as, for example, coating, evaporation, or the like. Afterward, the insulating layer, the semiconductor layer, and the conductive layer may be selectively patterned by performing a photolithography process multiple times. Afterward, the semiconductor pattern, the conductive pattern, and the signal line included in the circuit layer 120 may be formed.

The light emitting element layer 130 may be disposed on the circuit layer 120. The light emitting element layer 130 may include a light emitting element. For example, the light emitting element layer 130 may include an organic light emitting material, an inorganic light emitting material, an organic-inorganic light emitting material, a quantum dot, a quantum rod, a micro-LED, or a nano-LED.

The encapsulation layer 140 may be disposed on the light emitting element layer 130. The encapsulation layer 140 may protect the light emitting element layer 130 from foreign substances such as, for example, moisture, oxygen, and dust particles.

The sensor layer 200 may be formed on the display layer 100 through a successive process. In this case, the sensor layer 200 may be directly disposed on the display layer 100.

"Being directly disposed" means that an intervening component is not interposed between the sensor layer 200 and the display layer 100. That is, in embodiments, a separate adhesive member is not interposed between the sensor layer 200 and the display layer 100. Alternatively, the sensor layer 200 may be coupled to the display layer 100 through an adhesive member. The adhesive member may include, for example, a common adhesive or a common sticking agent.

Figure 4B:
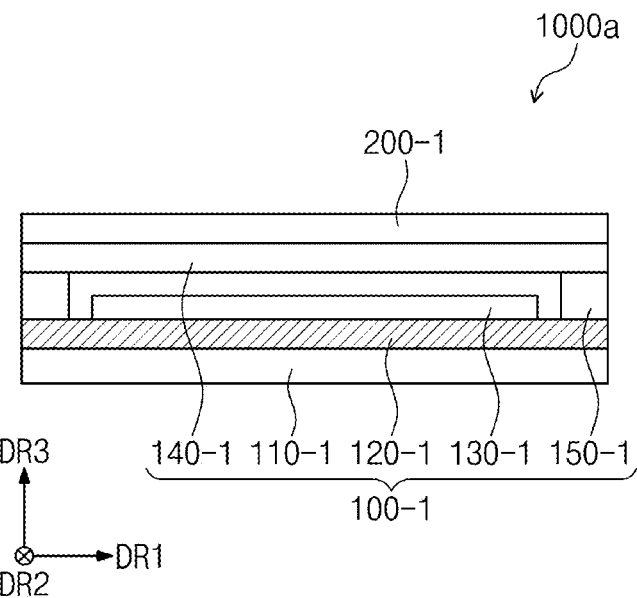
FIG. 4B is a cross-sectional view of an electronic device, according to an embodiment of the present disclosure.

FIG. 4B is a cross-sectional view of an electronic device, according to an embodiment of the present disclosure.

Referring to FIG. 4B, an electronic device 1000a may include a display layer 100-1 and a sensor layer 200-1. The display layer 100-1 may include a base substrate 110-1, a circuit layer 120-1, a light emitting element layer 130-1, an encapsulation substrate 140-1, and a coupling member 150-1.

Each of the base substrate 110-1 and the encapsulation substrate 140-1 may be, for example, a glass substrate, a metal substrate, a polymer substrate, or the like, but is not particularly limited thereto.

The coupling member 150-1 may be interposed between the base substrate 110-1 and the encapsulation substrate 140-1. The coupling member 150-1 may couple the encapsulation substrate 140-1 to the base substrate 110-1 or the circuit layer 120-1. The coupling member 150-1 may include an inorganic material or an organic material. For example, the inorganic material may include a frit seal, and the organic material may include a photo-curable resin or a photo-plastic resin. However, the material constituting the coupling member 150-1 is not limited to the example.

The sensor layer 200-1 may be directly disposed on the encapsulation substrate 140-1. "Being directly disposed" means that an intervening component is not interposed between the sensor layer 200-1 and the encapsulation substrate 140-1. That is, in embodiments, a separate adhesive member is not interposed between the sensor layer 200-1 and the display layer 100-1. However, embodiments of the present disclosure are not limited thereto, and an adhesive layer may be further interposed between the sensor layer 200-1 and the encapsulation substrate 140-1.

Figure 5:
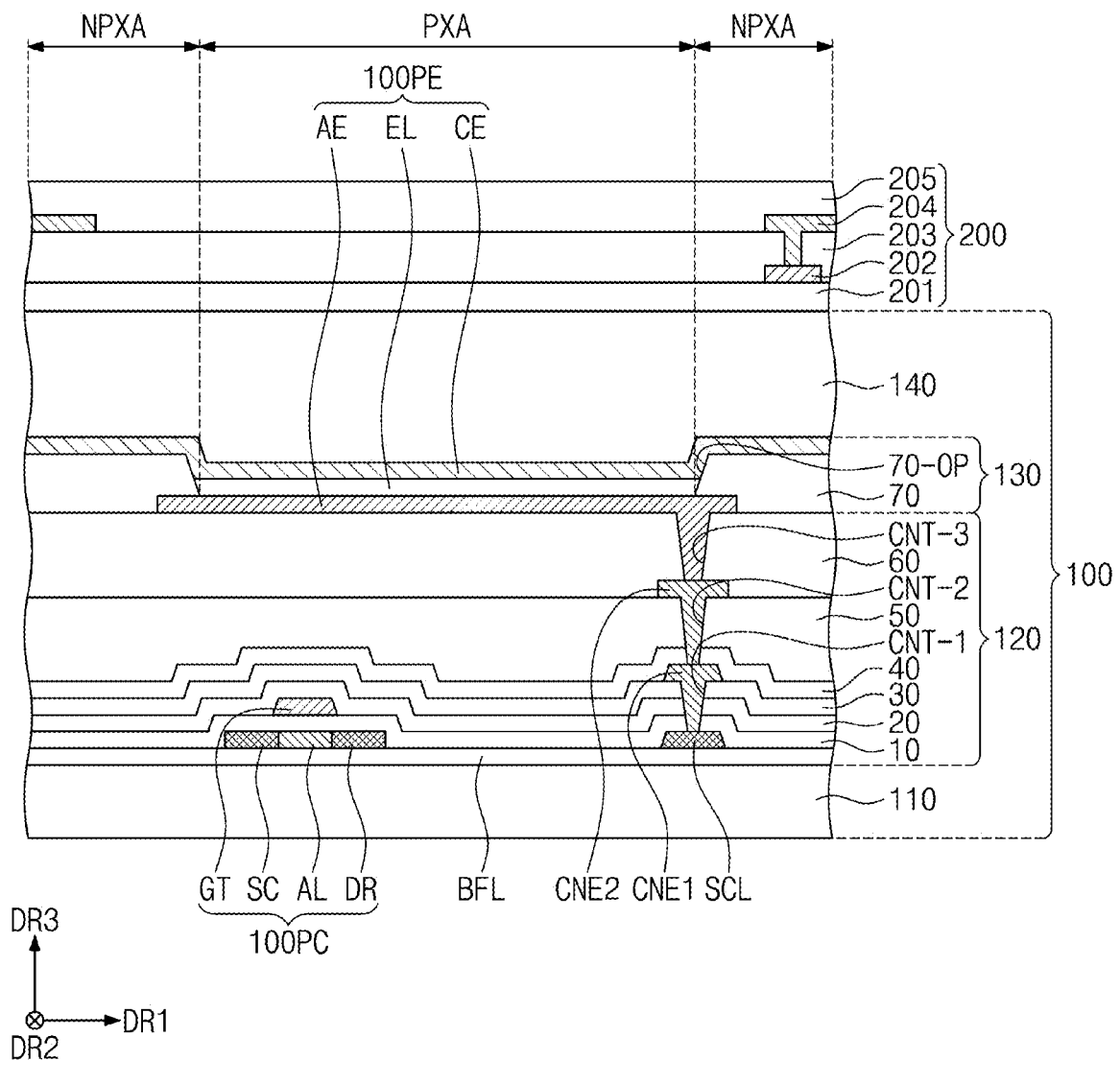
FIG. 5 is a cross-sectional view of an electronic device, according to an embodiment of the present disclosure.

FIG. 5 is a cross-sectional view of an electronic device, according to an embodiment of the present disclosure. In the description of FIG. 5, the same reference numerals are assigned to the same components described with reference to FIG. 4A, and thus, for convenience of explanation, redundant descriptions thereof are omitted.

Referring to FIG. 5, at least one inorganic layer may be formed on the upper surface of the base layer 110. The inorganic layer may include at least one of, for example, aluminum oxide, titanium oxide, silicon oxide, silicon oxynitride, zirconium oxide, and hafnium oxide. The inorganic layer may be formed of multiple layers. The multiple inorganic layers may constitute a barrier layer and/or a buffer layer. In an embodiment, the display layer 100 is illustrated as including a buffer layer BFL.

The buffer layer BFL may increase a bonding force between the base layer 110 and a semiconductor pattern. The buffer layer BFL may include, for example, a silicon oxide layer and a silicon nitride layer. The silicon oxide layer and the silicon nitride layer may be stacked alternately.

The semiconductor patterns SC, AL, DR, and SCL may be disposed on the buffer layer BFL. The semiconductor patterns SC, AL, DR, and SCL may include polysilicon. However, embodiments of the present disclosure are not limited thereto. For example, the semiconductor patterns SC, AL, DR, and SCL may include amorphous silicon, low-temperature polycrystalline silicon, or an oxide semiconductor.

FIG. 5 only illustrates a part of the semiconductor patterns SC, AL, DR, and SCL, and the semiconductor pattern may be further disposed in another area not illustrated in FIG. 5. The semiconductor patterns SC, AL, DR, and SCL may be arranged across pixels according to a specific rule. The semiconductor patterns SC, AL, DR, and SCL may have a different electrical property depending on whether the semiconductor patterns SC, AL, DR, and SCL are doped. The semiconductor patterns SC, AL, DR, and SCL may include the first areas SC, DR, and SCL having a high conductivity, and the second area AL having a low conductivity. The first areas SC, DR, and SCL may be doped with an N-type dopant or a P-type dopant. A P-type transistor may include a doped area doped with a P-type dopant, and an N-type transistor may include a doped area doped with an N-type dopant. The second area AL may be an undoped area or may be doped with a concentration lower than a concentration in the first area SC, DR, or SCL.

A conductivity of each of the first areas SC, DR, and SCL is greater than a conductivity of the second area AL. The first areas SC, DR, and SCL may substantially serve as an electrode or a signal line. The second area AL may substantially correspond to an active area (or a channel) of a transistor. In other words, the portion AL of the semiconductor patterns SC, AL, DR, and SCL may be the active area AL of a transistor 100PC, other parts SC and DR may be the source area SC or the drain area DR of the transistor 100PC, and the other part SCL may be a connection electrode or the connection signal line SCL.

Each of pixels may include an equivalent circuit including a plurality of transistors, at least one capacitor, and at least one light emitting element. The equivalent circuit of a pixel may be modified in various forms. The one transistor 100PC and one light emitting element 100PE included in a pixel are illustrated in FIG. 5 by way of example.

The source area SC, the active area AL, and the drain area DR of the transistor 100PC may be formed from the semiconductor patterns SC, AL, DR, and SCL. The source area SC and the drain area DR may extend in directions opposite to each other from the active area AL in a cross-sectional view. A portion of the connection signal line SCL formed from the semiconductor patterns SC, AL, DR, and SCL is illustrated in FIG. 5. The connection signal line SCL may be connected to the drain area DR of the transistor 100PC in a plan view.

A first insulating layer 10 may be disposed on the buffer layer BFL. The first insulating layer 10 may overlap a plurality of pixels in common and may cover the semiconductor patterns SC, AL, DR, and SCL. The first insulating layer 10 may be an inorganic layer and/or an organic layer, and may have a single-layer or multi-layer structure. The first insulating layer 10 may include at least one of, for example, aluminum oxide, titanium oxide, silicon oxide, silicon nitride, silicon oxynitride, zirconium oxide, and hafnium oxide. In an embodiment, the first insulating layer 10 may be a silicon oxide layer having a single-layer structure. Not only the first insulating layer 10, but also an insulating layer of the circuit layer 120 to be described later, may be an inorganic layer and/or an organic layer, and may have a single-layer structure or a multi-layer structure. The inorganic layer may include at least one of the above-described materials, but is not limited thereto.

A gate GT of the transistor 100PC is disposed on the first insulating layer 10. The gate GT may be a part of a metal pattern. The gate GT overlaps the active area AL. The gate GT may function as a mask in a process of reducing the semiconductor patterns SC, AL, DR, and SCL.

A second insulating layer 20 is disposed on the first insulating layer 10 and may cover the gate GT. The second insulating layer 20 may overlap pixels in common. The second insulating layer 20 may be an inorganic layer and/or an organic layer, and may have a single-layer structure or a multi-layer structure. The second insulating layer 20 may include at least one of, for example, silicon oxide, silicon nitride, and silicon oxynitride. In an embodiment, the second insulating layer 20 may have a multi-layer structure including a silicon oxide layer and a silicon nitride layer.

A third insulating layer 30 may be disposed on the second insulating layer 20. The third insulating layer 30 may have a single-layer structure or a multi-layer structure. For example, the third insulating layer 30 may have a multi-layer structure including a silicon oxide layer and a silicon nitride layer.

A first connection electrode CNE1 may be disposed on the third insulating layer 30. The first connection electrode CNE1 may be connected to the connection signal line SCL through a contact hole CNT-1 penetrating the first, second, and third insulating layers 10, 20, and 30.

A fourth insulating layer 40 may be disposed on the third insulating layer 30. The fourth insulating layer 40 may be a single silicon oxide layer. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected to the first connection electrode CNE1 through a contact hole CNT-2 penetrating the fourth insulating layer 40 and the fifth insulating layer 50.

A sixth insulating layer 60 may be disposed on the fifth insulating layer 50 and may cover the second connection electrode CNE2. The sixth insulating layer 60 may be an organic layer.

The light emitting element layer 130 may be disposed on the circuit layer 120. The light emitting element layer 130 may include the light emitting element 100PE. For example, the light emitting element layer 130 may include an organic light emitting material, an inorganic light emitting material, an organic-inorganic light emitting material, a quantum dot, a quantum rod, a micro-LED, or a nano-LED. Hereinafter, the description will assume that the light emitting element 100PE is an organic light-emitting element, but embodiments of the present disclosure are not limited thereto.

The light emitting element 100PE may include a first electrode AE, a light emitting layer EL, and a second electrode CE. The first electrode AE may be disposed on the sixth insulating layer 60. The first electrode AE may be connected to the second connection electrode CNE2 through a contact hole CNT-3 penetrating the sixth insulating layer 60.

A pixel defining layer 70 may be disposed on the sixth insulating layer 60 and may cover a portion of the first electrode AE. An opening 70-OP is defined in the pixel defining layer 70. The opening 70-OP of the pixel defining layer 70 exposes at least part of the first electrode AE.

The display area 1000A (see FIG. 1) may include an emission area PXA and a non-emission area NPXA disposed adjacent to the emission area PXA. The non-emission area NPXA may surround the emission area PXA. In an embodiment, the emission area PXA is defined to correspond to a partial area of the first electrode AE, which is exposed by the opening 70-OP.

The light emitting layer EL may be disposed on the first electrode AE. The light emitting layer EL may be disposed in an area corresponding to the opening 70-OP. FIG. 5 shows an example of the light emitting layer EL disposed within the opening 70-OP, but the arrangement is not particularly limited thereto. For example, in an embodiment, the light emitting layer EL may extend to cover a portion of a side surface of the pixel defining layer 70 and a top surface of the pixel defining layer 70, which define the opening 70-OP.

In an embodiment of the present disclosure, the light emitting layer EL may be separately formed on each of a plurality of pixels. When the light emitting layers EL are separately formed in each of the pixels, each of the light emitting layers EL may emit light of at least one of a blue color, a red color, and a green color. However, embodiments of the present disclosure are not limited thereto. For example, in an embodiment, the light emitting layer EL may be connected and included in each of the pixels in common. In this case, the light emitting layer EL may provide blue light or white light.

The second electrode CE may be disposed on the light emitting layer EL. The second electrode CE may be included in a plurality of pixels in common while having an integral shape.

In an embodiment of the present disclosure, a hole control layer may be interposed between the first electrode AE and the light emitting layer EL. The hole control layer may be disposed in common in the emission area PXA and the non-emission area NPXA. The hole control layer may include a hole transport layer and may further include a hole injection layer. An electron control layer may be interposed between the light emitting layer EL and the second electrode CE. The electron control layer may include an electron transport layer and may further include an electron injection layer. The hole control layer and the electron control layer may be formed in common in the plurality of pixels by using an open mask or inkjet process.

The encapsulation layer 140 may be disposed on the light emitting element layer 130. The encapsulation layer 140 may include, for example, an inorganic layer, an organic layer, and an inorganic layer sequentially stacked. However, layers constituting the encapsulation layer 140 are not limited thereto. The inorganic layers may protect the light emitting element layer 130 from, for example, moisture and oxygen, and the organic layer may protect the light emitting element layer 130 from a foreign material such as, for example, dust particles. The inorganic layers may include, for example, a silicon nitride layer, a silicon oxynitride layer, a silicon oxide layer, a titanium oxide layer, an aluminum oxide layer, or the like. The organic layer may include, for example, an acrylic-based organic layer.

The sensor layer 200 may include a base insulating layer 201, a first conductive layer 202, an intermediate insulating layer 203, a second conductive layer 204, and a cover insulating layer 205.

The base insulating layer 201 may be an inorganic layer including at least one of, for example, silicon nitride, silicon oxynitride, and silicon oxide. Alternatively, the base insulating layer 201 may be an organic layer including, for example, an epoxy resin, an acrylate resin, or an imide-based resin. The base insulating layer 201 may have a single-layer structure or may have a multi-layer structure stacked in the third direction DR3.

Each of the first conductive layer 202 and the second conductive layer 204 may have a single-layer structure or may have a multi-layer structure in which layers are stacked in the third direction DR3.

Each of the first conductive layer 202 and the second conductive layer 204 of a single-layer structure may include a metal layer or a transparent conductive layer. The metal layer may include, for example, molybdenum, silver, titanium, copper, aluminum, or an alloy thereof. The transparent conductive layer may include a transparent conductive oxide such as, for example, indium tin oxide (ITO), indium zinc oxide (IZO), zinc oxide (ZnO), indium zinc tin oxide (IZTO), or the like. The transparent conductive layer may include a conductive polymer such as, for example, poly(3, 4-ethylenedioxythiophene)(PEDOT), a metal nano wire, graphene, and the like.

Each of the first conductive layer 202 and the second conductive layer 204 of the multi-layer structure may include metal layers. For example, the metal layers may have a three-layer structure of titanium/aluminum/titanium. The conductive layer of the multi-layer structure may include at least one metal layer and at least one transparent conductive layer.

In an embodiment of the present disclosure, the thickness of the first conductive layer 202 may be greater than or about equal to the thickness of the second conductive layer 204. When the thickness of the first conductive layer 202 is greater than the thickness of the second conductive layer 204, the resistance of a component (e.g., an electrode, a sensing pattern, or a bridge pattern) included in the first conductive layer 202 may be reduced. Moreover, because the first conductive layer 202 is disposed under the second conductive layer 204, the probability that components included in the first conductive layer 202 are to be recognized by external light reflection may be lower than that of the second conductive layer 204, even though the thickness of the first conductive layer 202 is increased.

At least one of the intermediate insulating layer 203 and the cover insulating layer 205 may include an inorganic film. The inorganic film may include at least one of, for example, aluminum oxide, titanium oxide, silicon oxide, silicon nitride, silicon oxynitride, zirconium oxide, and hafnium oxide.

At least one of the intermediate insulating layer 203 and the cover insulating layer 205 may include an organic film. The organic film may include at least one of, for example, acrylate-based resin, methacrylate-based resin, polyisoprene, vinyl-based resin, epoxy-based resin, urethane-based resin, cellulose-based resin, siloxane-based resin, polyimide-based resin, polyamide-based resin, and perylene-based resin.

In the previous description, it was assumed that the sensor layer 200 includes a total of two conductive layers (e.g., the first conductive layer 202 and the second conductive layer 204). However, embodiments of the present disclosure are not limited thereto. For example, according to embodiments, the sensor layer 200 may include three or more conductive layers.

Figure 6:
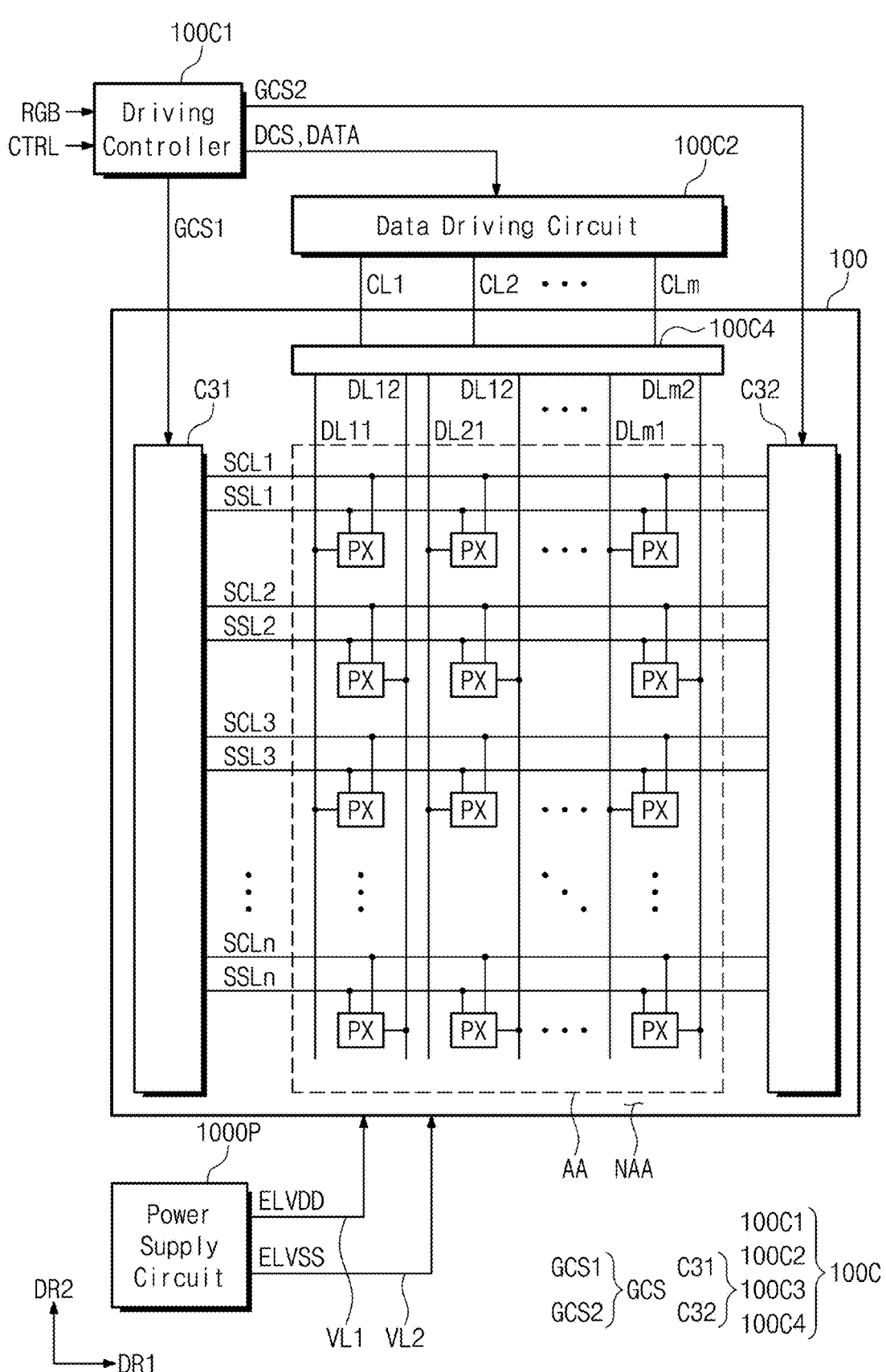
FIG. 6 is a block diagram of a display layer and a display driver, according to an embodiment of the present disclosure.

FIG. 6 is a block diagram of a display layer and a display driver, according to an embodiment of the present disclosure.

Referring to FIG. 6, the display driver 100C includes a driving controller 100C1, a data driving circuit 100C2, a scan driving circuit 100C3, and a switching circuit 100C4.

The display layer 100 includes driving scan lines SCL1, SCL2, and SCL3 to SCLn, sensing scan lines SSL1, SSL2, and SSL3 to SSLn, data lines DL11, DL12, DL21, DL22 to DLm1, and DLm2, and pixels PX. Here, 'n' and 'm' are integers greater than or equal to 1. The display layer 100 may be divided into an active area AA and an inactive area NAA. The pixels PX may be disposed in the active area AA of the display layer 100. The scan driving circuit 100C3 may be disposed in the inactive area NAA of the display layer 100.

The driving scan lines SCL1 to SCLn and the sensing scan lines SSL1 to SSLn extend in parallel with the first direction DR1 and are arranged (e.g., spaced apart from each other) in the second direction DR2. The second direction DR2 is a direction intersecting the first direction DR1. The data lines DL11 to DLm2 extend in parallel with the second direction DR2 and are arranged (e.g., spaced apart from each other) in the first direction DR1.

The plurality of pixels PX are electrically connected to the driving scan lines SCL1 to SCLn, the sensing scan lines SSL1 to SSLn, and the data lines DL11 to DLm2. Each of the plurality of pixels PX may be electrically connected to two scan lines. However, the number of scan lines connected to each of the pixels PX is not limited thereto. For example, according to embodiments, each pixel may be electrically connected to one or three scan lines. The display layer 100 may further include read-out lines (also referred to as sensing lines), which extend in the second direction DR2 and which are arranged in the first direction DR1. In this case, the plurality of pixels PX may be connected to the read-out lines.

Each of the plurality of pixels PX includes a light emitting element and a pixel circuit unit that controls the emission of the light emitting element. The light emitting element may include, for example, an organic light emitting diode, an inorganic light emitting diode, a micro-LED, or a nano-LED. The pixel circuit unit may include a plurality of transistors and at least one capacitor.

The driving controller 100C1 receives the input image signal RGB and the control signal CTRL from the main controller 1000C (see FIG. 3). The driving controller 100C1 may generate image data DATA by converting the input image signal RGB.

The driving controller 100C1 generates the scan control signal GCS and the data control signal DCS based on the control signal CTRL. The data driving circuit 100C2 receives the data control signal DCS and the image data DATA from the driving controller 100C1, and then converts the image data DATA into data voltages (also referred to as data signals) in response to the data control signal DCS. The data driving circuit 100C2 outputs the data voltages to the plurality of data lines DL11 to DLm2. The data voltages may be analog voltages corresponding to grayscale values of the image data DATA.

Alternatively, the data driving circuit 100C2 may be further connected to a plurality of read-out lines. In this case, the data driving circuit 100C2 may further receive a sensing control signal from the driving controller 100C1, and may sense the characteristics of elements included in each of the pixels PX of a display panel DP in response to the sensing control signal.

According to an embodiment of the present disclosure, the data driving circuit 100C2 may be formed in the form of at least one chip (or an integrated circuit). The data driving circuit 100C2 may be placed in the inactive area NAA of the display layer 100, but is not limited thereto. For example, the data driving circuit 100C2 may be mounted on a circuit film connected to the display layer 100.

According to an embodiment of the present disclosure, the switching circuit 100C4 may be placed between the data lines DL11 to DLm2 and the data driving circuit 100C2. The data driving circuit 100C2 may be connected to the switching circuit 100C4 through channel lines CL1 to CLm (also referred to as fan-out lines). According to an embodiment of the present disclosure, the number (m) of channel lines CL1 to CLm may be ½ of the number (2m) of data lines DL11 to DLm2. When the number (m) of channel lines CL1 to CLm is ½ of the number (2m) of data lines DL11 to DLm2, the data lines DL11 to DLm2 may be divided into two groups (e.g., a first data line group and a second data line group). During a first selection period, the switching circuit 100C4 electrically connects some (e.g., the first data line group) of the data lines DL11 to DLm2 to the data driving circuit 100C2. During a second selection period, the switching circuit 100C4 electrically connects some (e.g., the second data line group) of the data lines DL11 to DLm2 to the data driving circuit 100C2.

According to an embodiment of the present disclosure, the switching circuit 100C4 may be disposed in the inactive area NAA of the display layer 100. For example, the switching circuit 100C4 may be formed in the inactive area NAA through the same process as the pixel circuit unit of each of the pixels PX. The data lines DL11 to DLm2 may be selectively driven by using the switching circuit 100C4.

In FIG. 6, it is described that the switching circuit 100C4 is implemented as a separate circuit. However, embodiments of the present disclosure are not limited thereto. For example, the switching circuit 100C4 may be included in the data driving circuit 100C2 or may be mounted on a flexible circuit film or printed circuit board (PCB) on which the data driving circuit 100C2 is mounted.

The scan driving circuit 100C3 receives the scan control signal GCS from the driving controller 100C1. The scan driving circuit 100C3 may output scan signals in response to the scan control signal GCS. The scan driving circuit 100C3 may be disposed in the display layer 100. When the scan driving circuit 100C3 is disposed in the display layer 100, the scan driving circuit 100C3 may include transistors formed through the same process as the pixel circuit unit of each of the pixels PX. The scan driving circuit 100C3 may be disposed in the inactive area NAA of the display layer 100. However, embodiments of the present disclosure are not limited thereto. The scan driving circuit 100C3 may overlap the active area AA of the display layer 100.

The scan driving circuit 100C3 may generate a plurality of driving scan signals and a plurality of sensing scan signals in response to the scan control signal GCS. The plurality of driving scan signals are applied to the driving scan lines SCL1 to SCLn. The plurality of sensing scan signals are applied to the sensing scan lines SSL1 to SSLn.

According to an embodiment of the present disclosure, the scan driving circuit 100C3 includes a first scan driving circuit C31 and a second scan driving circuit C32. The first scan driving circuit C31 may be disposed on the left side of the active area AA, and the second scan driving circuit C32 may be disposed on the right side of the active area AA. The first scan driving circuit C31 may receive a first scan control signal GCS1 from the driving controller 100C1, and the second scan driving circuit C32 may receive a second scan control signal GCS2 from the driving controller 100C1. The first scan driving circuit C31 may generate a plurality of driving scan signals and a plurality of sensing scan signals in response to the first scan control signal GCS1. The second scan driving circuit C32 may generate a plurality of driving scan signals and a plurality of sensing scan signals in response to the second scan control signal GCS2.

FIG. 6 shows a structure in which the first and second scan driving circuits C31 and C32 are respectively positioned on the left and right sides of the active area AA. However, embodiments of the present disclosure are not limited thereto. For example, according to embodiments, the scan driving circuit 100C3 may include only one of the first and second scan driving circuits C31 and C32.

In an embodiment of the present disclosure, the display layer 100 may further include light emitting control lines, and the display driver 100C may further include an emission driving circuit that provides emission control signals to the light emitting control lines.

Each of the plurality of pixels PX may receive a first driving voltage ELVDD and a second driving voltage ELVSS.

The power supply circuit 1000P may generate voltages utilized for the operation of the display layer 100. In an embodiment of the present disclosure, the power supply circuit 1000P generates the first driving voltage ELVDD and the second driving voltage ELVSS, which are utilized for the operation of the display layer 100. The first driving voltage ELVDD and the second driving voltage ELVSS may be provided to the display layer 100 through a first driving voltage line VL1 and a second driving voltage line VL2, respectively.

In addition to the first driving voltage ELVDD and the second driving voltage ELVSS, the power supply circuit 1000P may further generate various voltages (e.g., a gamma reference voltage, a data driving voltage, a gate-on voltage, and a gate-off voltage) utilized for operations of the data driving circuit 100C2 and the scan driving circuit 100C3.

Figure 7:
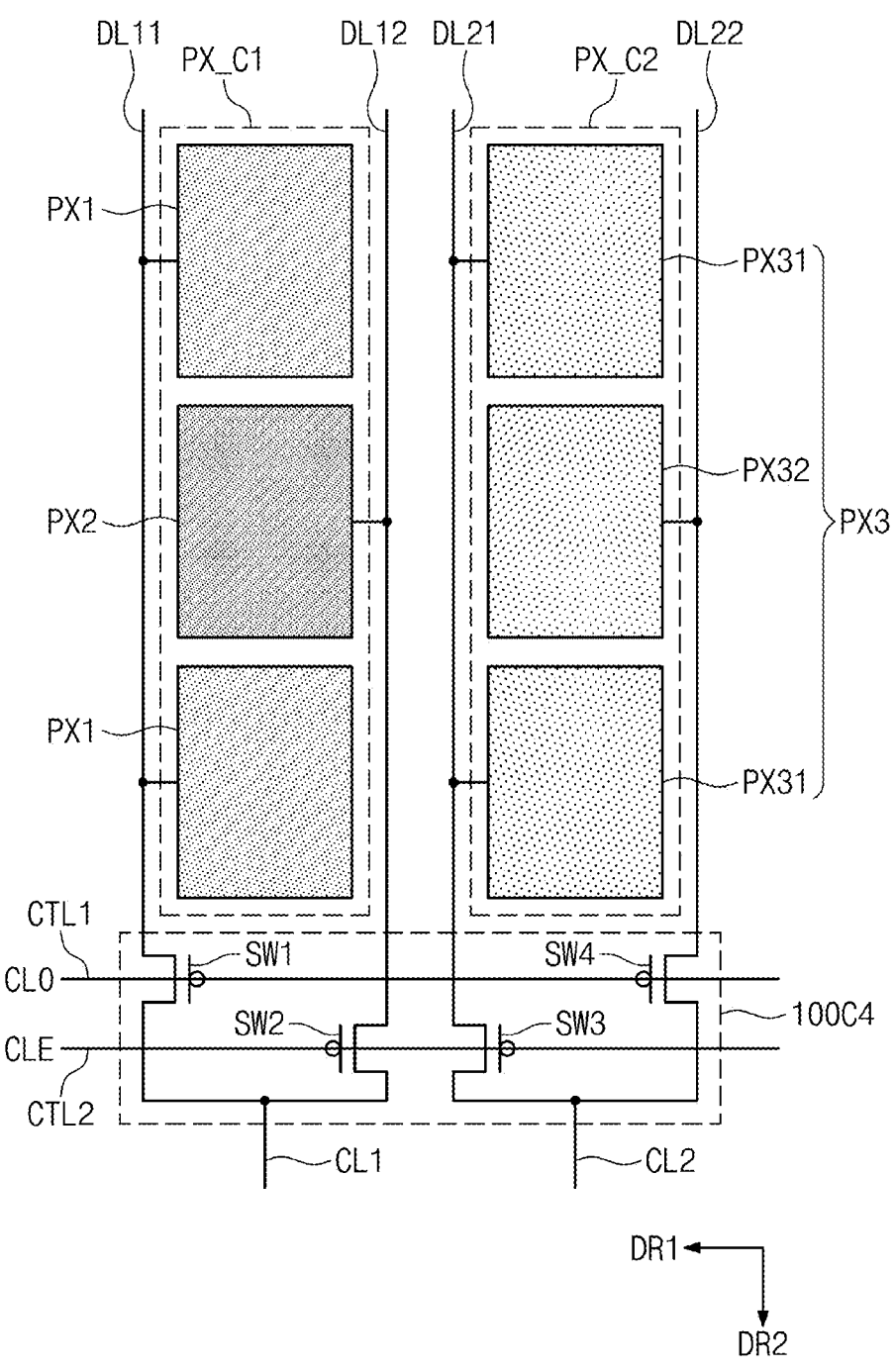
FIG. 7 is a plan view showing a portion of a display layer and a switching circuit, according to an embodiment of the present disclosure.

FIG. 7 is a plan view showing a portion of a display layer and a switching circuit, according to an embodiment of the present disclosure.

Referring to FIGS. 6 and 7, the pixels PX are arranged in a matrix form in the first and second directions DR1 and DR2 within the active area AA. The pixels PX includes first pixel columns PX_C1, which are parallel to the second direction DR2, and second pixel columns PX_C2, which are parallel to the first pixel columns PX_C1. The first pixel columns PX_C1 and the second pixel columns PX_C2 are disposed adjacent to each other in the first direction DR1. In an embodiment of the present disclosure, each of the first pixel columns PX_C1 includes first pixels PX1 and second pixels PX2. For example, the first pixels PX1 may output first color light, and the second pixels PX2 may output second color light different from the first color light. The first color light may be red light, and the second color light may be blue light. The first pixels PX1 and the second pixels PX2 may be alternately arranged in the second direction DR2. For example, the first pixels PX1 may be disposed in odd-numbered rows, and the second pixels PX2 may be disposed in even-numbered rows.

Each of the second pixel columns PX_C2 includes third pixels PX3, which output third color light. For example, the third color light may be different from the first color light and the second color light and may be, for example, green light. A 3-1st pixel PX31 among the third pixels PX3 may be disposed adjacent to the first pixels PX1 in the first direction DR1, and a 3-2nd pixel PX32 among the third pixels PX3 may be disposed adjacent to the second pixels PX2 in the first direction DR1. For example, the 3-1st pixels PX31 may be disposed in odd-numbered rows, and the 3-2nd pixels PX32 may be placed in even-numbered rows. The first and second pixel columns PX_C1 and PX_C2 may be repeatedly and alternately arranged in the first direction DR1.

Each first pixel column PX_C1 may be connected to two data lines (e.g., referred to as a "1-1st data line DL11" and a "1-2nd data line DL12"), and each second pixel column PX_C2 may be connected to two data lines (e.g., referred to as a "2-1st data line DL21" and a "2-2nd data line DL22").

Here, the 1-1st data line DL11 and the 2-2nd data line DL22 may be included in a first data line group, and the 1-2nd data line DL12 and the 2-1st data line DL21 may be included in a second data line group.

The 1-1st data line DL11 may be disposed on the first side (e.g., the left) of the first pixel column PX_C1 to be connected to the first pixels PX1 of the first pixel column PX_C1. The 1-2nd data line DL12 may be disposed on the second side (e.g., the right) of the first pixel column PX_C1 to be connected to the second pixels PX2 of the first pixel column PX_C1. The 2-1st data line DL21 may be disposed on the first side (e.g., the left) of the second pixel column PX_C2 to be connected to the 3-1st pixels PX31 of the second pixel column PX_C2. The 2-2nd data line DL22 may be disposed on the second side (e.g., the right) of the second pixel column PX_C2 to be connected to the 3-2nd pixels PX32 of the second pixel column PX_C2.

The switching circuit 100C4 may include first and second switching elements SW1 and SW2 connected to the first pixel column PX_C1, and may include third and fourth switching elements SW3 and SW4 connected to the second pixel column PX_C2. The first switching element SW1 is connected between the 1-1st data line DL11 and the data driving circuit 100C2. The second switching element SW2 is connected between the 1-2nd data line DL12 and the data driving circuit 100C2. The first and second switching elements SW1 and SW2 are electrically connected to the data driving circuit 100C2 through one channel line (e.g., a first channel line CL1). The third switching element SW3 is connected between the 2-1st data line DL21 and the data driving circuit 100C2. The fourth switching element SW4 is connected between the 2-2nd data line DL22 and the data driving circuit 100C2. The third and fourth switching elements SW3 and SW4 are electrically connected to the data driving circuit 100C2 through one channel line (e.g., a second channel line CL2).

The switching circuit 100C4 is connected to a first selection signal line CTL1 and a second selection signal line CTL2. The switching circuit 100C4 receives a first selection signal CLO through the first selection signal line CTL1, and the switching circuit 100C4 receives a second selection signal CLE through the second selection signal line CTL2. The switching circuit 100C4 may selectively connect the first channel line CL1 to one of the 1-1st data line DL11 and the 1-2nd data line DL12 in response to the first selection signal CLO and the second selection signal CLE. The switching circuit 100C4 may selectively connect the second channel line CL2 to one of the 2-1st data line DL21 and the 2-2nd data line DL22 in response to the first selection signal CLO and the second selection signal CLE. The first and second selection signals CLO and CLE may be alternately activated. In other words, in a period in which the first selection signal CLO is activated, the second selection signal CLE is deactivated. In a period in which the second selection signal CLE is activated, the first selection signal CLO is deactivated.

The first switching element SW1 may be connected to the 1-1st data line DL11, the first channel line CL1, and the first selection signal line CTL1. The second switching element SW2 may be connected to the 1-2nd data line DL12, the first channel line CL1, and the second selection signal line CTL2. The third switching element SW3 may be connected to the 2-1st data line DL21, the second channel line CL2, and the second selection signal line CTL2. The fourth switching element SW4 may be connected to the 2-2nd data line DL22, the second channel line CL2, and the first selection signal line CTL1.

When the switching circuit 100C4 receives the activated first selection signal CLO and the deactivated second selection signal CLE, the first and fourth switching elements SW1 and SW4 are turned on, and the second and third switching elements SW2 and SW3 are turned off. The turned-on first and fourth switching elements SW1 and SW4 may apply first and second data voltages, which are supplied through the first and second channel lines CL1 and CL2, to the first pixel PX1 and the 3-2nd pixel PX32, respectively.

When the switching circuit 100C4 receives the activated second selection signal CLE and the deactivated first selection signal CLO, the second and third switching elements SW2 and SW3 are turned on, and the first and fourth switching elements SW1 and SW4 are turned off. The turned-on second and third switching elements SW2 and SW3 may apply the first and second data voltages, which are supplied through the first and second channel lines CL1 and CL2, to the second pixel PX2 and the 3-1st pixel PX31, respectively.

Because the data line DL11 is connected to the first pixels PX1 outputting the first color light, the first data voltage supplied to the 1-1st data line DL11 includes only data information about the first color light. Similarly, because the 1-2nd data line DL12 is connected to the second pixels PX2 outputting the second color light, the second data voltage supplied to the 1-2nd data line DL12 includes only data information about the second color light.

As such, when a dedicated data line is placed for each color, a time (e.g., the time used to write data) utilized to apply a data voltage to all pixels connected to the dedicated data line may be shortened. As a result, the proportion of a time (which may be referred to, e.g., as a "data period", "first period", or "valid period") utilized to write data in one frame decreases, and thus, the proportion of a blank period (which may be referred to as, e.g., a "second period" or "invalid period") increases by the reduced amount.

Figure 8:
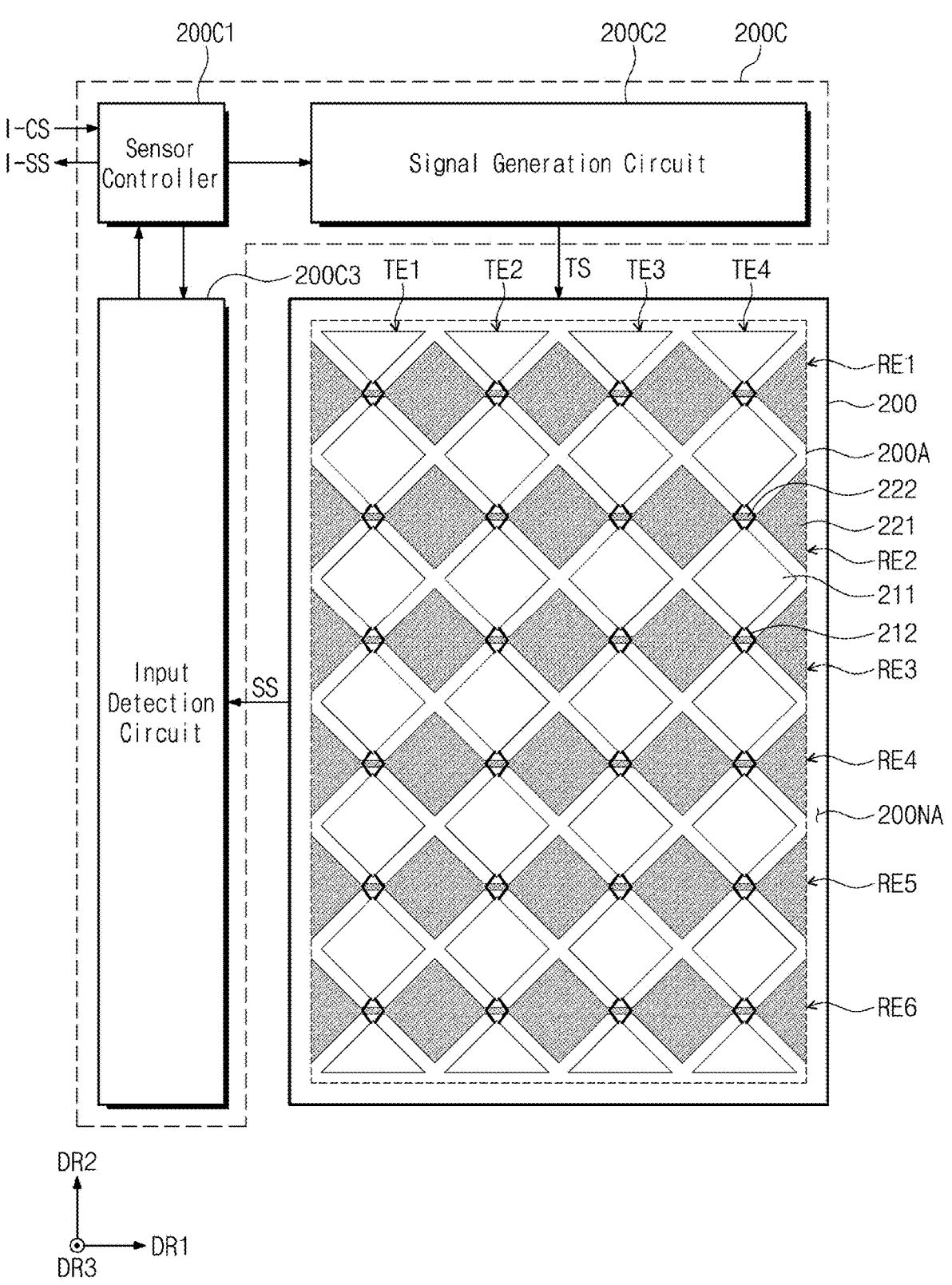
FIG. 8 is a block diagram of a sensor layer and a sensor driver, according to an embodiment of the present disclosure.

FIG. 8 is a block diagram of a sensor layer and a sensor driver, according to an embodiment of the present disclosure.

Referring to FIG. 8, an active sensing area 200A and an inactive sensing area 200N may be defined in the sensor layer 200. The active sensing area 200A may be an area activated depending on an electrical signal. For example, the active sensing area 200A may be an area in which an input is detected. The active sensing area 200A may overlap the active area AA (see FIG. 6) of the display layer 100 (see FIG. 6). The inactive sensing area 200N may surround the active sensing area 200A. The inactive sensing area 200N may be an area in which an input is not detected. The inactive sensing area 200N may overlap the inactive area NAA (see FIG. 6) of the display layer 100 (see FIG. 6).

The sensor layer 200 may include a plurality of first electrodes TE1, TE2, TE3, and TE4 (also referred to as transmission electrodes) and a plurality of second electrodes RE1, RE2, RE3, RE4, RE5, and RE6 (also referred to as reception electrodes). Each of the plurality of first electrodes TE1 to TE4 may extend in the second direction DR2, and the plurality of first electrodes TE1 to TE4 may be arranged (e.g., spaced apart from each other) in the first direction DR1. Each of the plurality of second electrodes RE1 to RE6 may extend in the first direction DR1, and the plurality of second electrodes RE1 to RE6 may be arranged (e.g., spaced apart from each other) in the second direction DR2.

The sensor layer 200 may further include a plurality of first signal wires (or first trace wires) connected to the plurality of first electrodes TE1 to TE4 and a plurality of second signal wires (or second trace wires) connected to the plurality of reception electrodes RE1 to RE6.

Each of the plurality of first electrodes TE1 to TE4 may include a first sensing portion 211 and a bridge portion 212. The two first sensing portions 211 disposed adjacent to each other may be electrically connected to each other by the bridge portion 212. However, embodiments of the present disclosure are not limited thereto. The first sensing portion 211 and the bridge portion 212 may be disposed on different layers from each other.

Each of the plurality of second electrodes RE1 to RE6 may include a second sensing portion 221 and a connection portion 222. The second sensing portion 221 and the connection portion 222 may be integrated with each other, and may be disposed on the same layer as each other. Each of the plurality of first electrodes TE1 to TE4 may have a mesh shape, and each of the plurality of second electrodes RE1 to RE6 may have a mesh shape.

The first and second sensing portions 211 and 221, the bridge portion 212, and the connection portion 222 may include a metal layer. The first and second sensing portions 211 and 221, the bridge portion 212, and the connection portion 222 may have mesh shapes, respectively.

The sensor driver 200C may receive the control signal I-CS from the main controller 1000C (see FIG. 3) and may provide the coordinate signal I-SS to the main controller 1000C (see FIG. 3).

The sensor driver 200C may include a sensor controller 200C1, a signal generation circuit 200C2, and an input detection circuit 200C3. The sensor controller 200C1, the signal generation circuit 200C2, and the input detection circuit 200C3 may be implemented in a single chip. Alternatively, a part of the sensor controller 200C1, the signal generation circuit 200C2, and the input detection circuit 200C3, and another part thereof, may be implemented in different chips from each other.

The sensor controller 200C1 may control operations of the signal generation circuit 200C2 and may calculate coordinates of an external input from a sensing signal received from the input detection circuit 200C3, or may analyze information transmitted by the input device 2000 (see FIG. 3) from the modulated signal received from the input detection circuit 200C3.

The signal generation circuit 200C2 may output signals TS (or transmission signals) to the sensor layer 200, for example, the first electrodes TE1 to TE4. The signal generation circuit 200C2 may output the output signal TS, which is matched with an operating mode, to the sensor layer 200.

The input detection circuit 200C3 may receive sensing signals SS from the sensor layer 200, for example, the reception electrodes RE1 to RE6. The input detection circuit 200C3 may convert an analog signal into a digital signal. For example, the input detection circuit 200C3 may amplify and then filter the received sensing signals SS having an analog format and may convert the filtered signal into the digital signal.

The sensor controller 200C1 may generate the coordinate signal I-SS based on the digital signal received from the input detection circuit 200C3. For example, the sensor controller 200C1 may generate the coordinate signal I-SS by using the digital signal.

Figure 9A:
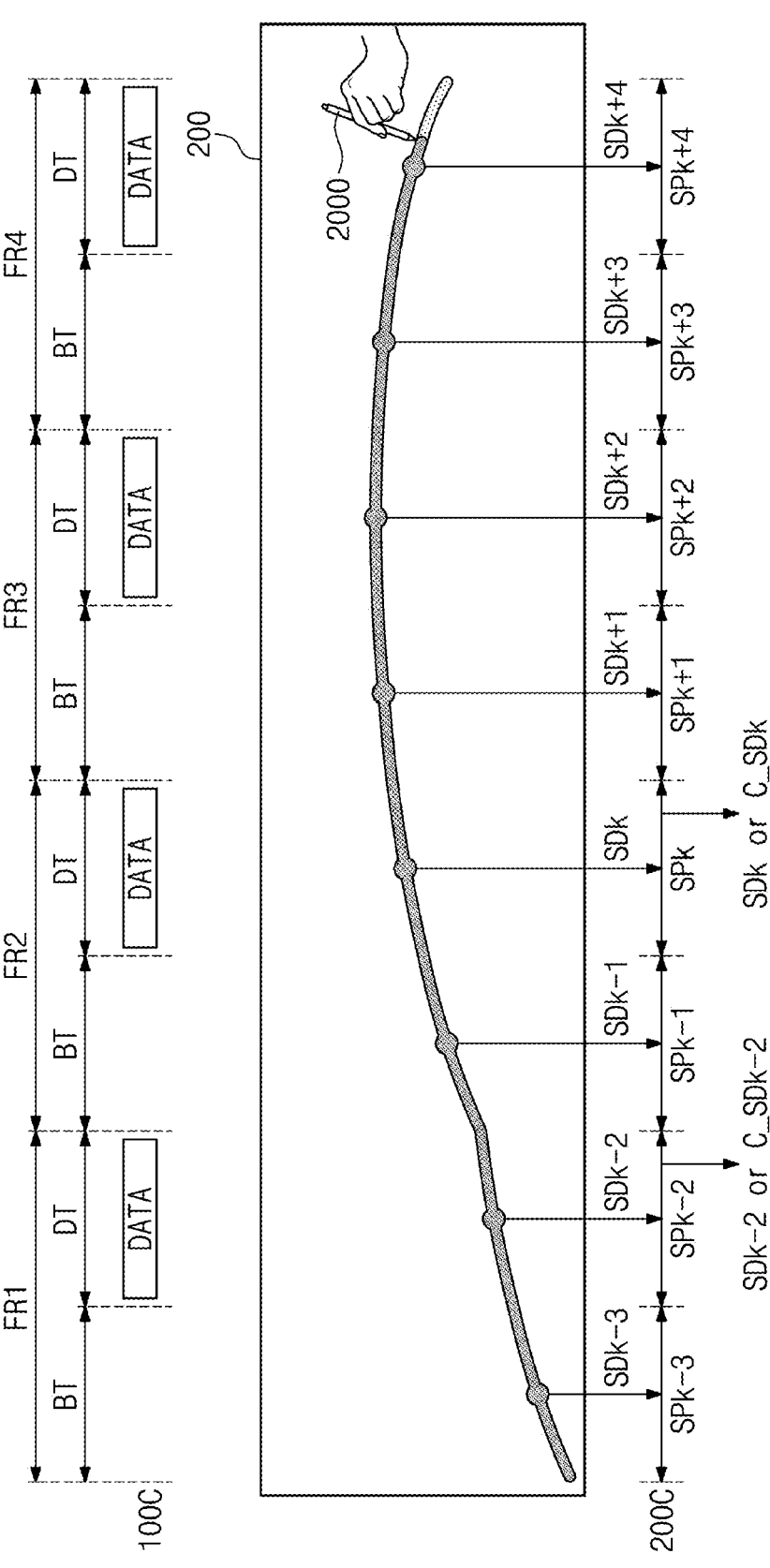
FIG. 9A is a diagram for describing an operation of a display driver and a sensor driver, according to an embodiment of the present disclosure.

FIG. 9A is a diagram for describing an operation of a display driver and a sensor driver, according to an embodiment of the present disclosure.

Referring to FIGS. 6, 8, and 9A, the display layer 100 may display images in units of a frame. FIG. 9A shows four frames (referred to as "first to fourth frames FR1, FR2, FR3, and FR4") that are temporally consecutive.

The display driver 100C (in particular, the data driving circuit 100C2 (see FIG. 6)) may provide the image data DATA to the display layer 100 in response to the operating frequency of each of the first to fourth frames FR1, FR2, FR3, and FR4. The operating frequency of each of the first to fourth frames FR1, FR2, FR3, and FR4 may be, for example, about 60 Hz, about 90 Hz, about 120 Hz, about 240 Hz, or the like, but is not limited thereto. In FIG. 9A, the first to fourth frames FR1, FR2, FR3, and FR4 have the same operating frequency as each other, but embodiments of the present disclosure are not limited thereto. For example, each of the first to fourth frames FR1, FR2, FR3, and FR4 may have an operating frequency different from that of at least one other frame.

Each of the first to fourth frames FR1, FR2, FR3, and FR4 may include a blank period BT and a data period DT. The data period DT (also referred to as a first period) is defined as a period in which data voltages are written in the display layer 100 (e.g., the pixels PX). The blank period BT (also referred to as a second period) is defined as a period in which data voltages are not written in the display layer 100 (e.g., the pixels PX). The blank period BT may be defined as a period in which the data voltages written in the pixels PX during the previous data period DT are held.

The duration of the blank period BT may be the same as or different from the duration of the data period DT. According to an embodiment of the present disclosure, the duration of each of the blank period BT and the data period DT may correspond to half the duration of each of the frames FR1, FR2, FR3, and FR4. In this case, the blank period BT and the data period DT may have the same duration as each other.

As shown in FIGS. 7 and 9A, when a dedicated data line is disposed for each color, the proportion of the data period DT in each of the frames FR1, FR2, FR3, and FR4 decreases, and thus the proportion of the blank period BT increases by the reduced amount. In other words, a noise-free period may be sufficiently secured in each of the frames FR1, FR2, FR3, and FR4, which may increase sensing reliability.

FIG. 9A shows that the data period DT lags the blank period BT within each of the frames FR1, FR2, FR3, and FR4. However, embodiments of the present disclosure are not limited thereto. For example, according to an embodiment, the data period DT may precede the blank period BT within each of the frames FR1, FR2, FR3, and FR4.

In a first mode, the sensor layer 200 may sense a first input by the input device 2000. The sensor layer 200 may sense the first input by using the sensing period as a unit. FIG. 9A shows eight consecutive sensing periods SPk–3, SPk–2, SPk–1, SPk, SPk+1, SPk+2, SPk+3, and SPk+4. The operating frequency of each of the sensing periods SPk–3 to SPk+4 may be, for example, about 120 Hz, about 240 Hz, or the like, but is not limited thereto. The operating frequency of each of the sensing periods SPk–3 to SPk+4 may be higher than or equal to the operating frequency of each of the frames FR1, FR2, FR3, and FR4. FIG. 9A shows that the operating frequency of each of the sensing periods SPk–3 to SPk+4 is twice the operating frequency of each of the frames FR1, FR2, FR3, and FR4. However, embodiments of the present disclosure are not limited thereto.

The sensor layer 200 may output k-th sensing data SDk for the first input during the k-th sensing period SPk. The sensor driver 200C may receive the k-th sensing data SDk from the sensor layer 200 during the k-th sensing period SPk. The k-th sensing period SPk may be referred to as a "current sensing period." The k-th sensing data SDk may be referred to as a "current sensing data." Here, 'k' may be an integer of 2 or more.

Sensing periods (e.g., the (k–3)-th sensing period SPk–3, the (k–2)-th sensing period SPk–2, and the (k–1)-th sensing period SPk–1) preceding the k-th sensing period SPk may be referred to as "previous sensing periods". Sensing periods (e.g., the (k+1)-th sensing period SPk+1, the (k+2)-th sensing period SPk+2, the (k+3)-th sensing period SPk+3, and the (k+4)-th sensing period SPk+4) lagging the k-th sensing period SPk may be referred to as "next sensing periods".

When receiving the k-th sensing data SDk, the sensor driver 200C may determine a period, in which the k-th sensing data SDk is sensed, from among the noise period and the noise-free period. According to an embodiment of the present disclosure, the data period DT may correspond to a noise period in which noise due to data voltages is relatively great. The blank period BT may correspond to a noise-free period in which noise caused by data voltages is relatively small or does not occur.

As shown in FIG. 9A, when the k-th sensing period SPk corresponds to the data period DT (e.g., a noise period), the sensor driver 200C may calculate noise from the k-th sensing data SDk. The sensor driver 200C may compare the calculated noise with predetermined reference noise. When the noise included in the k-th sensing data SDk is greater than the reference noise, the sensor driver 200C may generate k-th compensation sensing data C_SDk by interpolating the k-th sensing data SDk. The sensor driver 200C may generate coordinate information about the first input of the k-th sensing period SPk based on the k-th compensation sensing data C_SDk.

When the noise included in the k-th sensing data SDk is smaller than the reference noise, the sensor driver 200C does not interpolate the k-th sensing data SDk. In this case, the sensor driver 200C may generate coordinate information about the first input of the k-th sensing period SPk based on the k-th sensing data SDk.

Alternatively, when the k-th sensing data SDk corresponds to the blank period BT (e.g., a noise-free period), the sensor driver 200C may generate coordinate information about the first input of the k-th sensing period SPk based on the k-th sensing data SDk, without interpolating the k-th sensing data SDk.

The sensor driver 200C may interpolate the k-th sensing data SDk based on at least one of pieces of previous sensing data sensed during previous sensing periods. The pieces of previous sensing data sensed during the previous sensing periods may be one of (k–1)-th sensing data SDk–1 sensed during the (k–1)-th sensing period SPk–1, (k–2)-th sensing data SDk–2 sensed during the (k–2)-th sensing period SPk–2, and (k–3)-th sensing data SDk–3 sensed during the (k–3)-th sensing period SPk–3. According to an embodiment of the present disclosure, the sensor driver 200C may interpolate the k-th sensing data SDk based on the (k–1)-th sensing data SDk–1 sensed during the (k–1)-th sensing period SPk–1. Here, the (k–1)-th sensing period SPk–1 may correspond to the blank period BT (e.g., a noise-free period).

Alternatively, the sensor driver 200C may interpolate the k-th sensing data SDk based on the (k–1)-th sensing data SDk–1, and the (k–2)-th sensing data SDk–2 generated during the (k–2)-th sensing period SPk–2 (or (k–2)-th compensation sensing data C_SDk–2). Here, the (k–1)-th sensing period SPk–1 corresponds to the blank period BT (e.g., a noise-free period), and the (k–2)-th sensing period SPk–2 corresponds to the data period DT (e.g., a noise period). Accordingly, the sensor driver 200C may determine whether to interpolate the (k–2)-th sensing data SDk–2 without interpolating the (k–1)-th sensing data SDk–1. For example, when the noise included in the (k–2)-th sensing data SDk–2 is greater than the reference noise, the sensor driver 200C may generate the (k–2)-th compensation sensing data C_SDk–2 by interpolating the (k–2)-th sensing data SDk–2. However, according to embodiments, when the noise included in the (k–2)-th sensing data SDk–2 is smaller than the reference noise, the sensor driver 200C does not interpolate the (k–2)-th sensing data SDk–2.

Accordingly, the sensor driver 200C may interpolate the k-th sensing data SDk by using the (k–1)-th sensing data SDk–1 and the (k–2)-th sensing data SDk–2 or the (k–1)-th sensing data SDk–1 and the (k–2)-th compensation sensing data C_SDk–2.

Accordingly, the sensor driver 200C may interpolate the k-th sensing data SDk based on the (k–1)-th sensing data SDk–1, the (k–2)-th sensing data SDk–2 (or the (k–2)-th compensation sensing data C_SDk–2), and the (k–3)-th sensing data SDk–3. Here, the (k–1)-th sensing period SPk–1 corresponds to the blank period BT (e.g., a noise-free period), the (k–2)-th sensing period SPk–2 corresponds to the data period DT (e.g., a noise period), and the (k–3)-th sensing period SPk–3 corresponds to the blank period BT (e.g., a noise-free period).

As such, even when the k-th sensing data SDk is sensed in the noise period, the sensor driver 200C may obtain accurate coordinate information for the current sensing period SPk by performing an interpolation operation by using previous sensing data from the previous sensing periods SPk–3, SPk–2, and SPk–1. As a result, the sensing reliability of the electronic device 1000 (see FIG. 1) may be increased.

Figure 9B:
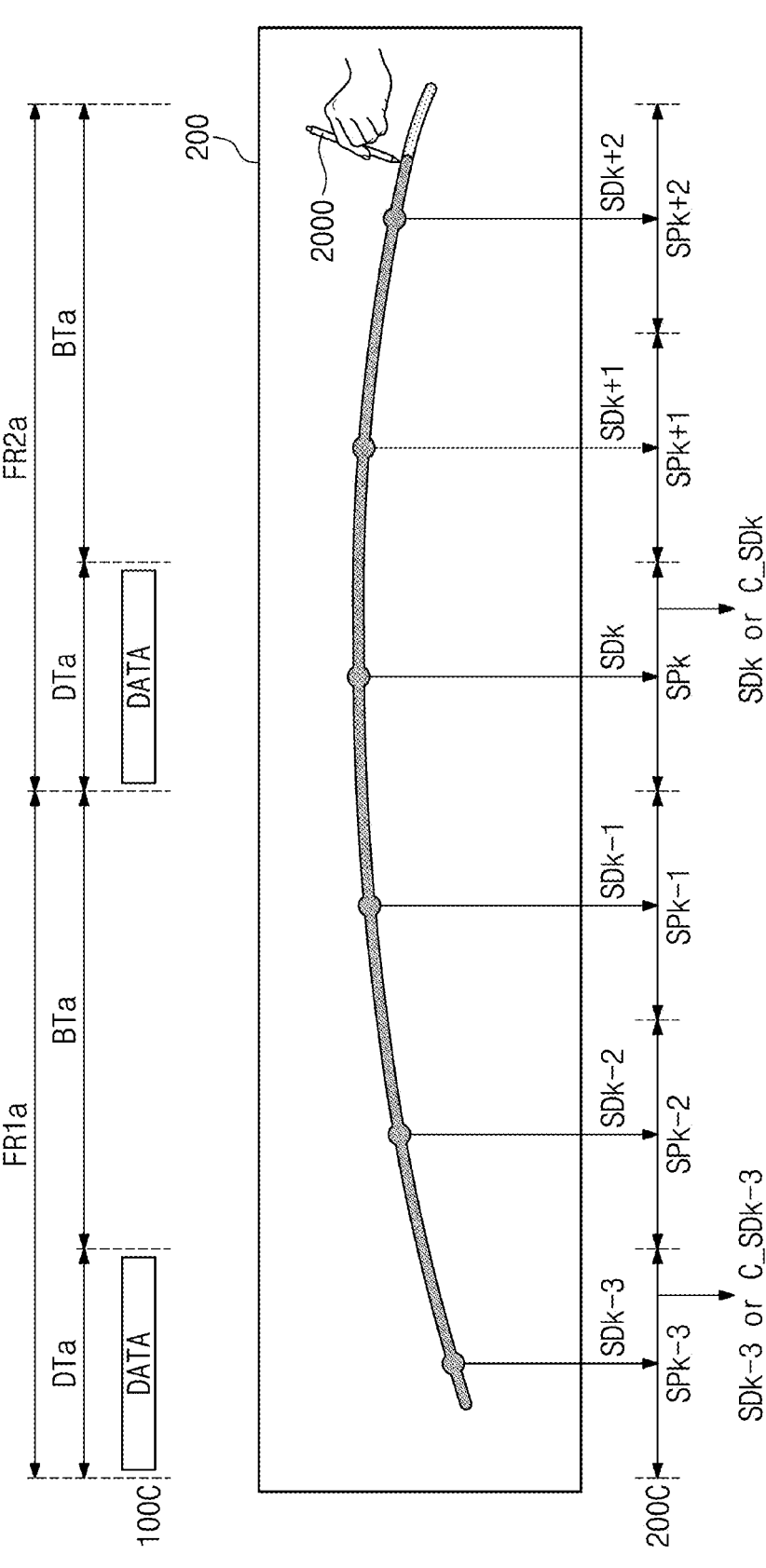
FIG. 9B is a diagram for describing an operation of a display driver and a sensor driver, according to an embodiment of the present disclosure.

FIG. 9B is a diagram for describing an operation of a display driver and a sensor driver, according to an embodiment of the present disclosure. In the description of FIG. 9B, the same reference numerals are assigned to the same components described with reference to FIG. 9A, and thus, for convenience of explanation, redundant descriptions thereof are omitted.

Referring to FIG. 9B, the display layer 100 may display images in units of a frame. FIG. 9B shows two frames (e.g., first and second frames FR1a and FR2a) that are temporally consecutive.

The display driver 100C (in particular, the data driving circuit 100C2 (see FIG. 6)) may provide the image data DATA to the display layer 100 in response to the operating frequency of each of the first and second frames FR1a and FR2a. The operating frequency of each of the first and second frames FR1a and FR2a may be lower than the operating frequency of each of the first to fourth frames FR1, FR2, FR3, and FR4 shown in FIG. 9A.

Each of the first and second frames FR1a and FR2a may include a data period DTa and a blank period BTa. The data period DTa (also referred to as a first period) is defined as a period in which data voltages are written in the display layer 100 (e.g., the pixels PX). The blank period BTa (also referred to as a second period) is defined as a period in which data voltages are not written in the display layer 100 (e.g., the pixels PX). The blank period BTa may be defined as a period in which the data voltages written in the pixels PX during the previous data period DTa are held.

The duration of the blank period BTa may be greater than the duration of the data period DTa. According to an embodiment of the present disclosure, when the operating frequency of each of the first and second frames FR1a and FR2a is lowered to reduce power consumption, the duration of the blank period BTa may be greater than twice the duration of the data period DTa.

In a first mode, the sensor layer 200 may sense a first input by the input device 2000. The sensor layer 200 may sense the first input by using the sensing period as a unit. FIG. 9B shows six consecutive sensing periods SPk−3, SPk−2, SPk−1, SPk, SPk+1, and SPk+2. The operating frequency of each of the sensing periods SPk−3 to SPk+2 may be, for example, about 120 Hz, about 240 Hz, or the like, but is not limited thereto. The operating frequency of each of the sensing periods SPk−3 to SPk+2 may be higher than the operating frequency of each of the frames FR1, FR2, FR3, and FR4. FIG. 9B shows that the operating frequency of each of the sensing periods SPk−3 to SPk+2 is three times the operating frequency of each of the frames FR1a and FR2a. However, embodiments of the present disclosure are not limited thereto.

The sensor layer 200 may output k-th sensing data SDk for the first input during the k-th sensing period SPk. The sensor driver 200C may receive the k-th sensing data SDk from the sensor layer 200 during the k-th sensing period SPk. The k-th sensing period SPk may be referred to as a current sensing period.

Sensing periods (e.g., the (k−3)-th sensing period SPk−3, the (k−2)-th sensing period SPk−2, and the (k−1)-th sensing period SPk−1) preceding the k-th sensing period SPk may be referred to as "previous sensing periods". Sensing periods (e.g., the (k+1)-th sensing period SPk+1 and the (k+2)-th sensing period SPk+2) lagging the k-th sensing period SPk may be referred to as "next sensing periods".

When receiving the k-th sensing data SDk, the sensor driver 200C determines a period, in which the k-th sensing data SDk is sensed, from among the noise period and the noise-free period. According to an embodiment of the present disclosure, the data period DTa may correspond to a noise period, and the blank period BTa may correspond to a noise-free period. As shown in FIG. 9B, when the k-th sensing period SPk corresponds to the data period DTa (e.g., a noise period), the sensor driver 200C may calculate noise from the k-th sensing data SDk. The sensor driver 200C compares the calculated noise with predetermined reference noise. When the noise included in the k-th sensing data SDk is greater than the reference noise, the sensor driver 200C generates k-th compensation sensing data C_SDk by interpolating the k-th sensing data SDk.

The sensor driver 200C may generate coordinate information about the first input of the k-th sensing period SPk based on the k-th compensation sensing data C_SDk.

When the noise included in the k-th sensing data SDk is smaller than the reference noise, the sensor driver 200C does not interpolate the k-th sensing data SDk. In this case, the sensor driver 200C may generate coordinate information about the first input of the k-th sensing period SPk based on the k-th sensing data SDk.

Alternatively, when the k-th sensing data SDk corresponds to the blank period BTa (e.g., a noise-free period), the sensor driver 200C may generate coordinate information about the first input of the k-th sensing period SPk based on the k-th sensing data SDk, without interpolating the k-th sensing data SDk.

The sensor driver 200C may interpolate the k-th sensing data SDk based on at least one of pieces of previous sensing data sensed during previous sensing periods. The pieces of previous sensing data sensed during the previous sensing periods may be one of (k−1)-th sensing data SDk−1 sensed during the (k−1)-th sensing period SPk−1, (k−2)-th sensing data SDk−2 sensed during the (k−2)-th sensing period SPk−2, and (k−3)-th sensing data SDk−3 sensed during the (k−3)-th sensing period SPk−3. According to an embodiment of the present disclosure, the sensor driver 200C may interpolate the k-th sensing data SDk based on the (k−1)-th sensing data SDk−1 sensed during the (k−1)-th sensing period SPk−1. Here, the (k−1)-th sensing period SPk−1 may correspond to the blank period BTa (e.g., a noise-free period).

Alternatively, the sensor driver 200C may interpolate the k-th sensing data SDk based on the (k−1)-th sensing data SDk−1 and the (k−2)-th sensing data SDk−2 generated during the (k−2)-th sensing period SPk−2. Here, the (k−1)-th sensing period SPk−1 and the (k−2)-th sensing period SPk−2 correspond to the blank period BTa (e.g., a noise-free period). Accordingly, in an embodiment, the sensor driver 200C does not interpolate the (k−1)-th sensing data SDk−1 and the (k−2)-th sensing data SDk−2.

Therefore, the sensor driver 200C interpolates the k-th sensing data SDk by using the (k−1)-th sensing data SDk−1 and the (k−2)-th sensing data SDk−2.

Alternatively, the sensor driver 200C may interpolate the k-th sensing data SDk based on the (k−1)-th sensing data SDk−1, the (k−2)-th sensing data SDk−2, and the (k−3)-th sensing data SDk−3 (or (k−3)-th compensation sensing data C_SDk−3). Here, the (k−1)-th sensing period SPk−1 and the (k−2)-th sensing data SDk−2 correspond to the blank period BTa (e.g., a noise-free period), and the (k−3)-th sensing period SPk−3 corresponds to the data period DTa (e.g., a noise period). Accordingly, the sensor driver 200C may determine whether to interpolate the (k−3)-th sensing data SDk−3. For example, when the noise included in the (k−3)-th sensing data SDk−3 is greater than the reference noise, the sensor driver 200C generates the (k−3)-th compensation sensing data C_SDk−3 by interpolating the (k−3)-th sensing data SDk−3. However, in an embodiment, when the noise included in the (k−3)-th sensing data SDk−3 is smaller than the reference noise, the sensor driver 200C does not interpolate the (k−3)-th sensing data SDk−3.

Accordingly, the sensor driver 200C interpolates the k-th sensing data SDk by using the (k−1)-th sensing data SDk−1, the (k−2)-th sensing data SDk−2, the (k−3)-th sensing data SDk−3 or the (k−1)-th sensing data SDk−1, the (k−2)-th sensing data SDk−2, and the (k−3)-th compensation sensing data C_SDk−3.

As such, even when the k-th sensing data SDk is sensed in the noise period, the sensor driver 200C may obtain accurate coordinate information for the current sensing period SPk by performing an interpolation operation by using previous sensing data from the previous sensing periods SPk−3, SPk−2, and SPk−1. As a result, the sensing reliability of the electronic device 1000 (see FIG. 1) may be increased.

FIGS. 9A and 9B illustrate that an interpolation operation is performed by using previous sensing data of at least one of the previous sensing periods SPk−3, SPk−2, and SPk−1. However, embodiments of the present disclosure are not limited thereto. For example, according to an embodiment, an interpolation operation may be performed by using only data sensed in a noise-free period among the previous sensing periods.

Referring to FIGS. 9A and 9B, it is described that the sensor driver 200C senses a first input by using both the data periods DT and DTa and the blank periods BT and BTa in a first mode. However, in a second mode, the sensor driver 200C may sense a second input by using only the blank periods BT and BTa. In the second mode, the second input is sensed during only the noise-free period (e.g., the blank periods BT and BTa), and thus, performing an interpolation operation may be omitted.

Figure 10:
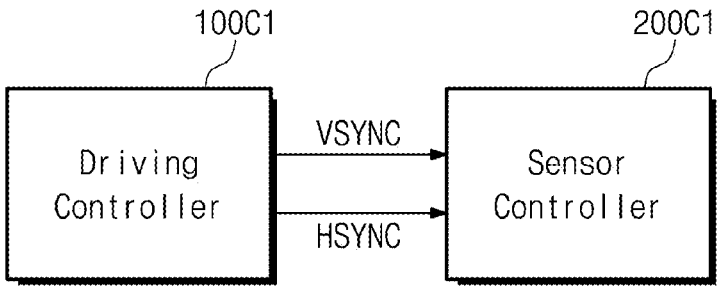
FIG. 10 is a block diagram showing a driving controller and a sensor controller, according to an embodiment of the present disclosure.

FIG. 10 is a block diagram showing a driving controller and a sensor controller, according to an embodiment of the present disclosure. FIGS. 11A to 11D are waveform diagrams showing a vertical synchronization signal and a horizontal synchronization signal, according to an embodiment of the present disclosure.

Referring to FIG. 10, the sensor controller 200C1 may receive a synchronization signal from the driving controller 100C1. According to an embodiment of the present disclosure, the synchronization signal may include a vertical synchronization signal VSYNC and a horizontal synchronization signal HSYNC. The driving controller 100C1 may provide the sensor controller 200C1 with at least one of the vertical synchronization signal VSYNC and the horizontal synchronization signal HSYNC.

Here, the vertical synchronization signal VSYNC may be a signal used to determine a start time point of each of the frames FR1 to FR4 (see FIG. 9A). The horizontal synchronization signal HSYNC may be a signal used to determine a start time point of the data period DT (see FIG. 9A) or an end time point of the blank period BT (see FIG. 9A) within each of the frames FR1 to FR4.

The driving controller 100C1 may process the synchronization signal so as to include information (referred to as "first information") about the start time point of the data period DT and information (referred to as "second information") about the start time point of the blank period BT, and then may transmit the processed synchronization signal to the sensor controller 200C1. According to an embodiment of the present disclosure, the first information and the second information may be expressed by using the vertical synchronization signal VSYNC and the horizontal synchronization signal HSYNC.

Referring to FIGS. 11A to 11D, the vertical synchronization signal VSYNC may include vertical active periods VAP1 and VAP2 and vertical inactive periods VNAP1 and VNAP2. According to an embodiment of the present disclosure, the vertical active periods VAP1 and VAP2 are low level periods, and the vertical inactive periods VNAP1 and VNAP2 are high level periods. However, embodiments of the present disclosure are not limited thereto. Alternatively, the vertical active periods VAP1 and VAP2 may be high level periods, and the vertical inactive periods VNAP1 and VNAP2 may be low level periods. The driving controller 100C1 may adjust the duration of each of the vertical active periods VAP1 and VAP2 depending on the operating frequency of each of the frames FR1 to FR4.

The horizontal synchronization signal HSYNC may include horizontal active periods HAP1 and HAP2 located within the vertical active periods VAP1 and VAP2. According to an embodiment of the present disclosure, the horizontal active periods HAP1 and HAP2 may be low level periods, but are not limited thereto. Alternatively, the horizontal active periods HAP1 and HAP2 may be high level periods. The driving controller 100C1 may adjust the duration of each of the horizontal active periods HAP1 and HAP2 depending on the duty ratio of the data period DT.

The horizontal synchronization signal HSYNC may be activated based on one horizontal scan period HSP. In other words, the horizontal scan period HSP may be defined as one cycle of the horizontal synchronization signal HSYNC. According to an embodiment of the present disclosure, the vertical active periods VAP1 and VAP2 may have a duration corresponding to 'j' times the horizontal scan period HSP. Here, 'j' is an integer of 1 or more.

According to an embodiment of the present disclosure, the vertical synchronization signal VSYNC may have the first vertical active period VAP1 and the second vertical active period VAP2. According to an embodiment of the present disclosure, the first vertical active period VAP1 may correspond to 1 time the horizontal scan period HSP, and the second vertical active period VAP2 may correspond to twice the horizontal scan period HSP. FIGS. 11A to 11D show that each of the first and second vertical active periods VAP1 and VAP2 is an integer multiple of the horizontal scan period HSP. However, embodiments of the present disclosure are not limited thereto.

According to an embodiment of the present disclosure, when the duration of the first vertical active period VAP1 is set to 1 time the duration of the horizontal scan period HSP in the case where the operating frequency is about 60 Hz, the duration of the second vertical active period VAP2 may be set to twice the duration of the horizontal scan period HSP when the operating frequency is about 120 Hz.

The operating frequency may be identified by comparing the duration of each of the vertical active periods VAP1 and VAP2 with the duration of the horizontal scan period HSP, and information about the start time point (or the start time point of the blank period BT) of each of the frames FR1 to FR4 may be obtained.

According to an embodiment of the present disclosure, the vertical synchronization signal VSYNC may have the first horizontal active period HAP1 or the second horizontal active period HAP2. According to an embodiment of the present disclosure, the duration of the second horizontal active period HAP2 may be greater than the duration of the first horizontal active period HAP1. When the first horizontal active period HAP1 indicates that the duty ratio of the data period DT is about 40%, the second horizontal active period HAP2 may indicate that the duty ratio of the data period DT is about 50%.

As shown in FIG. 11A, the duration of each frame is set to about 16.667 ms, and the data period DT starts at a time point at which the time has elapsed by about 10 ms (about 60% of 16.667 ms) from the start time point of each frame when the vertical synchronization signal VSYNC has the first vertical active period VAP1, and the horizontal synchronization signal HSYNC has the first horizontal active period HAP1.

As shown in FIG. 11B, the duration of each frame is set to about 16.667 ms, and the data period DT starts at a time point at which the time has elapsed by about 8.33 ms (about 50% of 16.667 ms) from the start time point of each frame when the vertical synchronization signal VSYNC has the first vertical active period VAP1, and the horizontal synchronization signal HSYNC has the second horizontal active period HAP2.

Figures 11C, 11D:
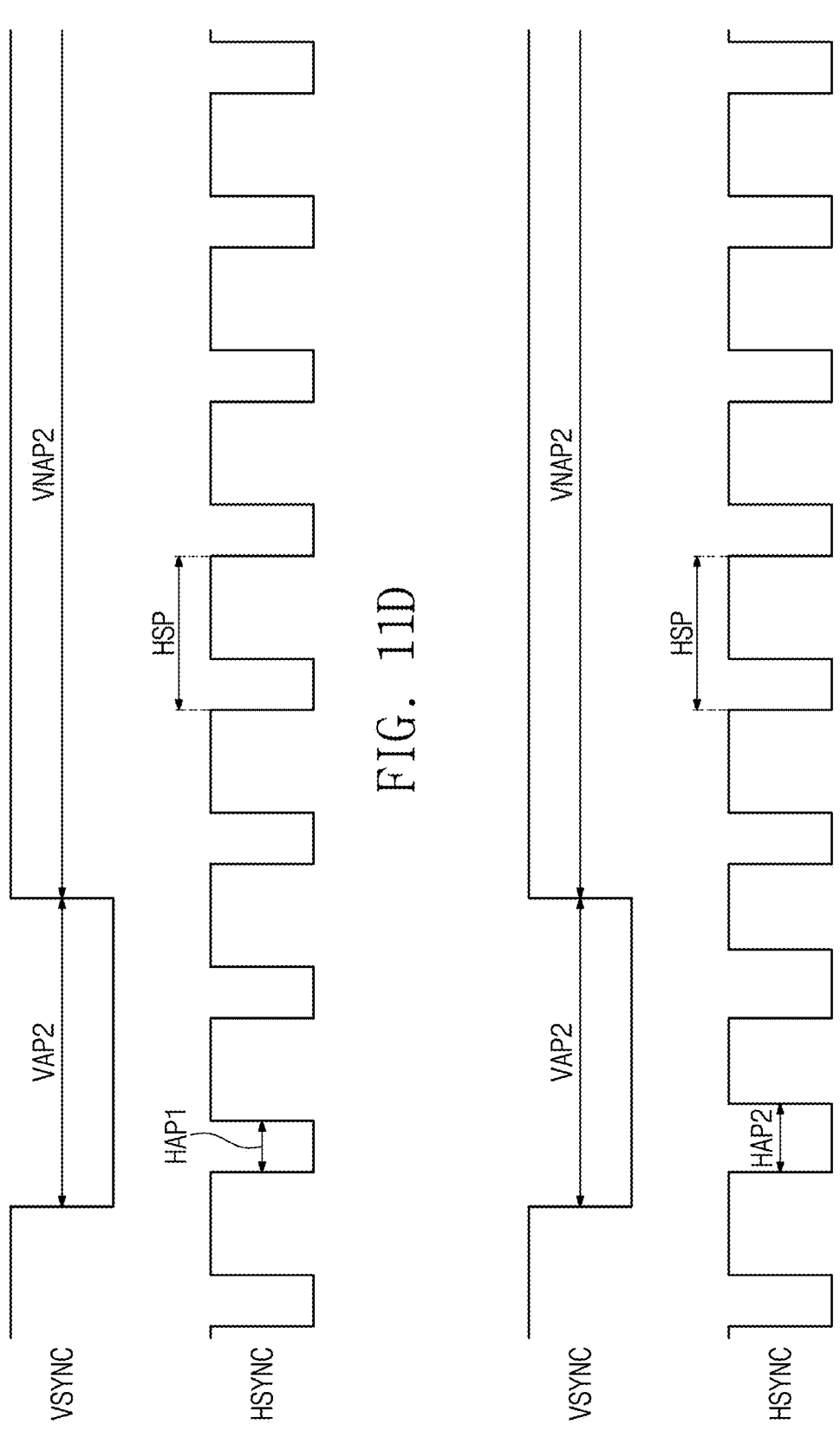

As shown in FIG. 11C, the duration of each frame is set to about 8.33 ms, and the data period DT starts at a time point at which the time has elapsed by about 5 ms (about 60% of 8.33 ms) from the start time point of each frame when the vertical synchronization signal VSYNC has the second vertical active period VAP2, and the horizontal synchronization signal HSYNC has the first horizontal active period HAP1.

As shown in FIG. 11D, the duration of each frame is set to about 8.33 ms, and the data period DT starts at a time point at which the time has elapsed by about 4.16 ms (about 50% of 8.33 ms) from the start time point of each frame when the vertical synchronization signal VSYNC has the second vertical active period VAP2, and the horizontal synchronization signal HSYNC has the second horizontal active period HAP2.

As such, the sensor controller 200C1 may obtain information about the start time point of the data period DT and information about the start time point of the blank period BT by using the vertical synchronization signal VSYNC and the horizontal synchronization signal HSYNC that are provided from the driving controller 100C1.

Figure 12:
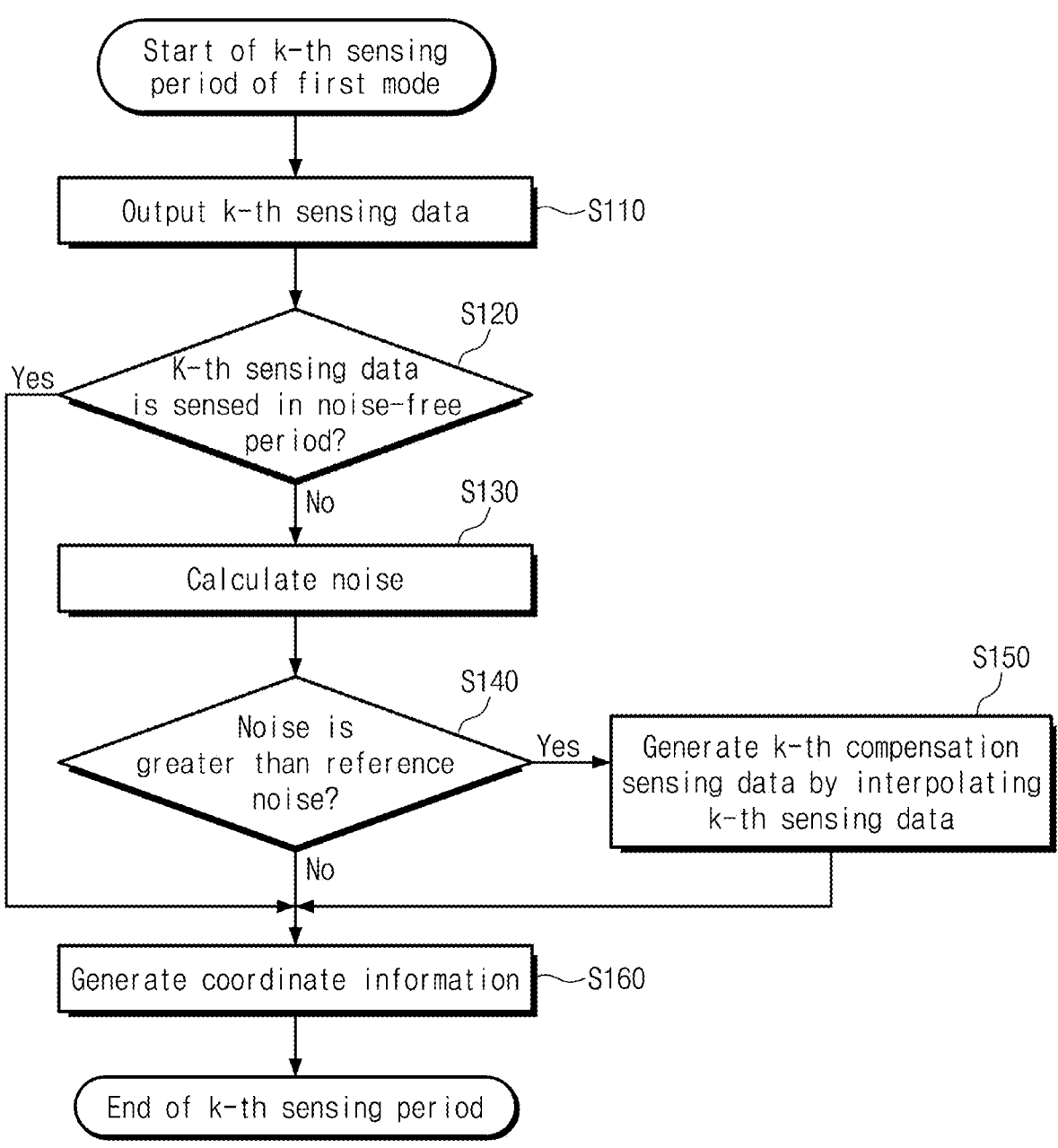
FIG. 12 is a flowchart showing an operation process of an electronic device, according to an embodiment of the present disclosure.

FIG. 12 is a flowchart showing an operation process of an electronic device, according to an embodiment of the present disclosure.

Referring to FIGS. 9A and 12, the sensor layer 200 may perform a sensing operation in a first mode. The sensor layer 200 may sense an input (or a first input) by using a sensing period as a unit.

The sensor layer 200 may output the k-th sensing data SDk for an input during the k-th sensing period SPk (S110). The k-th sensing period SPk may be referred to as a current sensing period.

The sensor driver 200C may receive the k-th sensing data SDk from the sensor layer 200 during the k-th sensing period SPk. When receiving the k-th sensing data SDk, the sensor driver 200C determines a period, in which the k-th sensing data SDk is sensed, from among the noise period and the noise-free period (S120). According to an embodiment of the present disclosure, the data period DT may correspond to a noise period in which noise due to data voltages is relatively great. The blank period BT may correspond to a noise-free period in which noise caused by data voltages is relatively small or does not occur.

When the k-th sensing period SPk corresponds to the data period DT (e.g., a noise period), the sensor driver 200C may calculate noise from the k-th sensing data SDk (S130). The sensor driver 200C compares the calculated noise with predetermined reference noise (S140). When the noise included in the k-th sensing data SDk is greater than the reference noise, the sensor driver 200C generates the k-th compensation sensing data C_SDk by interpolating the k-th sensing data SDk (S150). The sensor driver 200C may generate coordinate information about the input of the k-th sensing period SPk based on the k-th compensation sensing data C_SDk (S160).

When the noise included in the k-th sensing data SDk is smaller than the reference noise, the sensor driver 200C does not interpolate the k-th sensing data SDk. In this case, the sensor driver 200C may generate coordinate information about the input of the k-th sensing period SPk based on the k-th sensing data SDk (S160).

When the k-th sensing data SDk corresponds to the blank period BT (e.g., a noise-free period), the sensor driver 200C may generate coordinate information about the input of the k-th sensing period SPk based on the k-th sensing data SDk, without interpolating the k-th sensing data SDk (S160).

The sensor driver 200C may interpolate the k-th sensing data SDk based on at least one of pieces of previous sensing data sensed during previous sensing periods.

As such, even when the k-th sensing data SDk is sensed in the noise period, the sensor driver 200C may obtain accurate coordinate information for the current sensing period SPk by performing an interpolation operation by using previous sensing data from the previous sensing periods SPk−3, SPk−2, and SPk−1. As a result, the sensing reliability of the electronic device 1000 (see FIG. 1) may be increased.

As described above, accurate coordinate information for a current sensing period can be obtained by interpolating the current sensing data using previous sensing data from earlier sensing periods, even if the current sensing data is affected by noise. As a result, the sensing reliability of an electronic device that senses an input by the input device may be increased.

As is traditional in the field of the present disclosure, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An electronic device, comprising:
   a display layer configured to display an image in units of a frame;
   a sensor layer disposed on the display layer and configured to operate in a first mode, in which a first input is sensed, and to output k-th sensing data for the first input during a k-th sensing period in the first mode,
   wherein k is an integer greater than or equal to 2; and
   a sensor driver configured to:
   drive the sensor layer and receive the k-th sensing data from the sensor layer;
   determine whether the k-th sensing period, in which the k-th sensing data is sensed, corresponds to a noise period or a noise-free period;
   when the k-th sensing data is determined to correspond to the noise period, compare noise included in the k-th sensing data with predetermined reference noise; and
   when the noise included in the k-th sensing data is greater than the reference noise, generate k-th compensation sensing data by interpolating the k-th sensing data based on sensing data from at least one preceding period, including compensation sensing data generated for a preceding sensing period corresponding to the noise period, and generate coordinate information about the first input of the k-th sensing period based on the k-th compensation sensing data.

2. The electronic device of claim 1, wherein when the k-th sensing data is data sensed in the noise-free period, the sensor driver generates the coordinate information about the first input of the k-th sensing period based on the k-th sensing data.

3. The electronic device of claim 1, wherein the sensor driver is further configured to:
   generate the k-th compensation sensing data by interpolating the k-th sensing data based on (k−1)-th sensing data sensed during a (k−1)-th sensing period preceding the k-th sensing period, and wherein the (k−1)-th sensing period corresponds to the noise-free period.

4. The electronic device of claim 1, wherein the sensor driver is further configured to:

generate the k-th compensation sensing data by interpolating the k-th sensing data based on (k−1)-th sensing data sensed during a (k−1)-th sensing period preceding the k-th sensing period, and (k−2)-th sensing data generated during a (k−2)-th sensing period preceding the (k−1)-th sensing period, or (k−2)-th compensation sensing data, wherein the (k−1)-th sensing period corresponds to the noise-free period, and wherein the (k−2)-th sensing period corresponds to the noise period.

5. The electronic device of claim 1, wherein the sensor driver is further configured to:

generate the k-th compensation sensing data by interpolating the k-th sensing data based on (k−1)-th sensing data sensed during a (k−1)-th sensing period preceding the k-th sensing period, (k−2)-th sensing data generated during a (k−2)-th sensing period preceding the (k−1)-th sensing period or (k−2)-th compensation sensing data, and (k−3)-th sensing data sensed during a (k−3)-th sensing period preceding the (k−2)-th sensing period, wherein the (k−1)-th sensing period corresponds to the noise-free period, wherein the (k−2)-th sensing period corresponds to the noise period, and wherein the (k−3)-th sensing period corresponds to the noise-free period.

6. The electronic device of claim 1, wherein the display layer includes a plurality of pixels, wherein the frame includes a first period and a second period, which are consecutive, and wherein one of the first period and the second period corresponds to a data period in which data voltages are written in the pixels, and the other of the first period and the second period corresponds to a blank period in which the data voltages are not written in the pixels.

7. The electronic device of claim 6, wherein the blank period corresponds to the noise-free period, and the data period corresponds to the noise period, and wherein the k-th sensing period corresponds to the data period.

8. The electronic device of claim 6, wherein the pixels are arranged in a first direction and a second direction intersecting the first direction, and wherein a first pixel column extending in the second direction includes first pixels having a first color and second pixels having a second color different from the first color, and wherein the display layer further includes a 1-1st data line extending in the second direction and connected to the first pixels, and a 1-2nd data line extending in the second direction and connected to the second pixels.

9. The electronic device of claim 8, further comprising:

a data driving circuit configured to output the data voltages; and a switching circuit configured to switch an electrical connection between the data driving circuit and the 1-1st and 1-2nd data lines, wherein the switching circuit includes a first switching element connected between the 1-1st data line and the data driving circuit and a second switching element connected between the 1-2nd data line and the data driving circuit, and wherein the first switching element and the second switching element are alternately turned on.

10. The electronic device of claim 6, wherein the sensor layer further operates in a second mode different from the first mode, and wherein the second mode is a mode in which a second input different from the first input is detected.

11. The electronic device of claim 10, wherein the sensor layer outputs sensing data for the second input during a sensing period in the second mode, wherein the sensor driver is further configured to:

receive the sensing data in the second mode; and generate coordinate information about the second input based on the sensing data, wherein the sensing period corresponds to the blank period.

12. The electronic device of claim 6, further comprising:

a display driver configured to drive the display layer, wherein the sensor driver receives a synchronization signal from the display driver and determines a period, in which the k-th sensing data is sensed, from among the noise period and the noise-free period.

13. The electronic device of claim 12, wherein the synchronization signal includes a vertical synchronization signal that determines a start time point of the frame, and a horizontal synchronization signal that determines a start time point of the data period at which the data voltages are written in the pixels.

14. An interface device, comprising:

an electronic device; and an input device configured to communicate with the electronic device, wherein the electronic device includes:

a display layer configured to display an image in units of a frame;

a sensor layer disposed on the display layer and configured to detect an input from the input device and to output k-th sensing data for the input during a k-th sensing period, wherein k is an integer greater than or equal to 2; and a sensor driver configured to:

drive the sensor layer and receive the k-th sensing data from the sensor layer;

determine whether the k-th sensing period, in which the k-th sensing data is sensed, correspond to a noise period or a noise-free period;

when the k-th sensing data is determined to correspond to the noise period, compare noise included in the k-th sensing data with predetermined reference noise; and when the noise included in the k-th sensing data is greater than the reference noise, generate k-th compensation sensing data by interpolating the k-th sensing data based on sensing data from at least one preceding period, including compensation sensing data generated for a preceding sensing period corresponding to the noise period, and generate coordinate information about the input of the k-th sensing period based on the k-th compensation sensing data.

15. The interface device of claim 14, wherein when the k-th sensing data is data sensed in the noise-free period, the sensor driver generates the coordinate information about the input of the k-th sensing period based on the k-th sensing data.

16. The interface device of claim 14, wherein the sensor driver is further configured to:

generate the k-th compensation sensing data by interpolating the k-th sensing data based on (k−1)-th sensing data sensed during a (k−1)-th sensing period preceding the k-th sensing period, and wherein the (k−1)-th sensing period corresponds to the noise-free period.

17. The interface device of claim 14, wherein the sensor driver is further configured to:

generate the k-th compensation sensing data by interpolating the k-th sensing data based on (k−1)-th sensing data sensed during a (k−1)-th sensing period preceding the k-th sensing period, and (k−2)-th sensing data generated during a (k−2)-th sensing period preceding the (k−1)-th sensing period, or (k−2)-th compensation sensing data, wherein the (k−1)-th sensing period corresponds to the noise-free period, and wherein the (k−2)-th sensing period corresponds to the noise period.

18. The interface device of claim 14, wherein the sensor driver is further configured to:

generate the k-th compensation sensing data by interpolating the k-th sensing data based on (k−1)-th sensing data sensed during a (k−1)-th sensing period preceding the k-th sensing period, (k−2)-th sensing data generated during a (k−2)-th sensing period preceding the (k−1)-th sensing period or (k−2)-th compensation sensing data, and (k−3)-th sensing data sensed during a (k−3)-th sensing period preceding the (k−2)-th sensing period, wherein the (k−1)-th sensing period corresponds to the noise-free period, wherein the (k−2)-th sensing period corresponds to the noise period, and wherein the (k−3)-th sensing period corresponds to the noise-free period.

19. A driving method of an electronic device, the method comprising:

displaying an image in units of a frame;

outputting k-th sensing data for an input during a k-th sensing period in which the input is sensed, wherein k is an integer greater than or equal to 2;

determining whether the k-th sensing period, in which the k-th sensing data is sensed, corresponds to a noise period or a noise-free period;

when the k-th sensing data is determined to correspond to the noise period, comparing noise included in the k-th sensing data with predetermined reference noise;

when the noise included in the k-th sensing data is greater than the reference noise, generating k-th compensation sensing data by interpolating the k-th sensing data based on sensing data from at least one preceding period, including compensation sensing data generated for a preceding sensing period corresponding to the noise period; and generating coordinate information about the input of the k-th sensing period based on the k-th compensation sensing data.

20. The method of claim 19, further comprising:

when the k-th sensing data is data sensed in the noise-free period, generating the coordinate information about the input of the k-th sensing period based on the k-th sensing data.

21. The method of claim 19, wherein the k-th compensation sensing data is generated by interpolating the k-th sensing data based on (k−1)-th sensing data sensed during a (k−1)-th sensing period preceding the k-th sensing period, and wherein the (k−1)-th sensing period corresponds to the noise-free period.

22. The method of claim 19, wherein the k-th compensation sensing data is generated by interpolating the k-th sensing data based on (k−1)-th sensing data sensed during a (k−1)-th sensing period preceding the k-th sensing period, and (k−2)-th sensing data generated during a (k−2)-th sensing period preceding the (k−1)-th sensing period, or (k−2)-th compensation sensing data, wherein the (k−1)-th sensing period corresponds to the noise-free period, and wherein the (k−2)-th sensing period corresponds to the noise period.

23. The method of claim 19, wherein the k-th compensation sensing data is generated by interpolating the k-th sensing data based on (k−1)-th sensing data sensed during a (k−1)-th sensing period preceding the k-th sensing period, (k−2)-th compensation sensing data generated during a (k−2)-th sensing period preceding the (k−1)-th sensing period, and (k−3)-th sensing data sensed during a (k−3)-th sensing period preceding the (k−2)-th sensing period, wherein the (k−1)-th sensing period corresponds to the noise-free period, wherein the (k−2)-th sensing period corresponds to the noise period, and wherein the (k−3)-th sensing period corresponds to the noise-free period.

24. The method of claim 19, wherein the frame includes a first period and a second period, which are consecutive, wherein one of the first period and the second period corresponds to a data period in which data voltages are written in a plurality of pixels, and the other of the first period and the second period corresponds to a blank period in which the data voltages are not written in the pixels, and wherein the determining of whether the k-th sensing period, in which the k-th sensing data is sensed, corresponds to the noise period or the noise-free period, is performed based on a synchronization signal.

25. The method of claim 24, wherein the synchronization signal includes a vertical synchronization signal that determines a start time point of the frame, and a horizontal synchronization signal that determines a start time point of the data period at which the data voltages are written in the pixels.

* * * * *